(12) United States Patent
Li et al.

(10) Patent No.: US 12,082,220 B2
(45) Date of Patent: Sep. 3, 2024

(54) TECHNIQUES FOR CONNECTING USER EQUIPMENT WITH MULTIPLE BASE STATIONS THROUGH A WIRELESS REPEATER

(71) Applicant: QUALCOMM Incorporated, San Diego, CA (US)

(72) Inventors: Junyi Li, Chester, NJ (US); Ashwin Sampath, Skillman, NJ (US); Navid Abedini, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/926,967

(22) Filed: Jul. 13, 2020

(65) Prior Publication Data

US 2021/0037522 A1 Feb. 4, 2021

Related U.S. Application Data

(60) Provisional application No. 62/881,050, filed on Jul. 31, 2019.

(51) Int. Cl.
*H04W 72/044* (2023.01)
*H04L 5/00* (2006.01)
(Continued)

(52) U.S. Cl.
CPC .......... *H04W 72/27* (2023.01); *H04L 5/0092* (2013.01); *H04W 16/28* (2013.01); *H04W 24/08* (2013.01);
(Continued)

(58) Field of Classification Search
CPC . H04W 16/28; H04W 56/001; H04W 72/042; H04W 72/0426; H04W 72/046;
(Continued)

(56) References Cited

U.S. PATENT DOCUMENTS

2012/0093059 A1 4/2012 Bai et al.
2018/0376501 A1 12/2018 John Wilson et al.
(Continued)

FOREIGN PATENT DOCUMENTS

AU 2009348180 A1 1/2012
WO WO-2011095211 A1 8/2011

OTHER PUBLICATIONS

International Search Report and Written Opinion—PCT/US2020/041942—ISA/EPO—Oct. 1, 2020.

*Primary Examiner* — Harun Chowdhury
(74) *Attorney, Agent, or Firm* — Holland & Hart LLP

(57) ABSTRACT

Methods, systems, and devices for wireless communications are described. A wireless repeater may communicate with multiple base stations, and the wireless repeater may identify a first base station as a primary base station. The wireless repeater may monitor for and receive control information from the primary base station, where the control information may include control information from a second base station and used by the wireless repeater to communicate with one or more UEs connected to the second base station. The primary base station may receive an indication of the control information from the second base station via a backhaul link. In other examples, the wireless repeater may monitor for control information from the two or more base stations based on a control signaling pattern. For example, the wireless repeater may be configured with periodic time intervals for monitoring for control signaling from respective base stations.

28 Claims, 15 Drawing Sheets

(51) Int. Cl.
  *H04W 16/28*  (2009.01)
  *H04W 24/08*  (2009.01)
  *H04W 56/00*  (2009.01)
  *H04W 72/23*  (2023.01)
  *H04W 72/27*  (2023.01)
  *H04W 76/11*  (2018.01)
  *H04W 88/14*  (2009.01)

(52) U.S. Cl.
  CPC ....... *H04W 56/001* (2013.01); *H04W 72/046* (2013.01); *H04W 72/23* (2023.01); *H04W 76/11* (2018.02); *H04W 88/14* (2013.01)

(58) Field of Classification Search
  CPC . H04W 88/14; H04W 92/14; H04W 72/0446; H04W 72/23; H04L 5/0092
  USPC .................................. 370/252, 328, 329, 331
  See application file for complete search history.

(56) References Cited

U.S. PATENT DOCUMENTS

| | | | |
|---|---|---|---|
| 2019/0159102 A1 | 5/2019 | Ryu et al. | |
| 2019/0182000 A1* | 6/2019 | Futaki | H04L 5/0039 |
| 2019/0349079 A1* | 11/2019 | Novlan | H04W 72/0446 |
| 2020/0037200 A1* | 1/2020 | Cho | H04W 72/23 |
| 2021/0099914 A1* | 4/2021 | Wei | H04W 72/042 |
| 2021/0298000 A1* | 9/2021 | Park | H04W 16/32 |
| 2021/0345218 A1* | 11/2021 | Tsuda | H04W 92/14 |

\* cited by examiner

TECHNIQUES FOR CONNECTING USER EQUIPMENT WITH MULTIPLE BASE STATIONS THROUGH A WIRELESS REPEATER

CROSS REFERENCE

The present Application for Patent claims the benefit of U.S. Provisional Patent Application No. 62/881,050 by Li et al., entitled "TECHNIQUES FOR CONNECTING USER EQUIPMENT WITH MULTIPLE BASE STATIONS THROUGH A WIRELESS REPEATER," filed Jul. 31, 2019, assigned to the assignee hereof, which is hereby incorporated by reference in its entirety.

FIELD OF DISCLOSURE

The following relates to wireless communications and more specifically to techniques for connecting user equipment (UEs) with multiple base stations through a wireless repeater.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UEs.

Some wireless communications systems may support the use of wireless repeaters. For example, a wireless repeater may be located between a UE and a base station and may repeat and extend communications between the base station and UE. In some cases, a wireless repeater may be near multiple base stations.

SUMMARY

The described techniques relate to improved methods, systems, devices, and apparatuses that support techniques for connecting user equipment (UEs) with multiple base stations through a wireless repeater. The described techniques provide for transmitting control information to a wireless repeater from multiple base stations such that the wireless repeater may communicate with UEs associated with each base station. As an example, a wireless repeater may be in communication with two or more base stations that are connected to respective sets of UEs. In some cases, the wireless repeater may identify a first base station from the two or more base stations as a primary base station, and the wireless repeater may monitor for control information from the primary base station. The primary base station may transmit control information to the wireless repeater, where the control information may include control information (e.g., beam information, communication direction, etc.) from a second base station that may be used by the wireless repeater to communicate with one or more UEs connected to the second base station. Here, the primary base station may receive an indication of the control information from the second base station (e.g., via a backhaul link), and the primary base station may transmit the control information to the wireless repeater on behalf of the second base station. As a result, the repeater may receive control information from the first base station, the second base station, or both, by monitoring for transmissions from the primary base station.

Additionally or alternatively, the wireless repeater may use a configuration for monitoring for control information from the two or more base stations. For example, the wireless repeater may be configured with a pattern for monitoring for control signaling from the first base station and the second base station. The pattern may include periodic time intervals during which the wireless repeater monitors for control information from respective base stations (e.g., a first time interval for control signaling from the first base station and a second time interval for control signaling from the second base station). In this way, the wireless repeater may monitor for control information from multiple base stations, and the wireless repeater may communicate with UEs connected to each base station based on control information received during the time intervals.

A method of wireless communication at a first base station is described. The method may include identifying a second base station that is connected to one or more UEs via a wireless repeater, receiving, from the second base station, an indication of control information for the wireless repeater to communicate with the one or more UEs, and transmitting, to the wireless repeater, the control information based on the received indication.

An apparatus for wireless communication at a first base station is described. The apparatus may include a processor, memory coupled with the processor, and instructions stored in the memory. The instructions may be executable by the processor to cause the apparatus to identify a second base station that is connected to one or more UEs via a wireless repeater, receive, from the second base station, an indication of control information for the wireless repeater to communicate with the one or more UEs, and transmit, to the wireless repeater, the control information based on the received indication.

Another apparatus for wireless communication at a first base station is described. The apparatus may include means for identifying a second base station that is connected to one or more UEs via a wireless repeater, receiving, from the second base station, an indication of control information for the wireless repeater to communicate with the one or more UEs, and transmitting, to the wireless repeater, the control information based on the received indication.

A non-transitory computer-readable medium storing code for wireless communication at a first base station is described. The code may include instructions executable by a processor to identify a second base station that is connected to one or more UEs via a wireless repeater, receive, from the second base station, an indication of control information for the wireless repeater to communicate with the one or more UEs, and transmit, to the wireless repeater, the control information based on the received indication.

In some examples of the method, apparatuses, and non-transitory computer-readable medium described herein, receiving the indication of the control information may include operations, features, means, or instructions for receiving the indication of the control information over a backhaul link between the first base station and the second base station.

Some examples of the method, apparatuses, and non-transitory computer-readable medium described herein may further include operations, features, means, or instructions for determining second control information for the wireless repeater to communicate with one or more UEs connected to the first base station via the wireless repeater, determining a communications schedule for the wireless repeater based on the control information and the second control information, and transmitting, to the wireless repeater, the second control information based on the communications schedule.

In some examples of the method, apparatuses, and non-transitory computer-readable medium described herein, the control information includes an indication of at least one directional beam for communicating with the one or more UEs, a transmission direction, or any combination thereof.

In some examples of the method, apparatuses, and non-transitory computer-readable medium described herein, transmitting the control information may include operations, features, means, or instructions for transmitting the control information in a portion of a bandwidth used to transmit one or more synchronization signal blocks to the wireless repeater.

In some examples of the method, apparatuses, and non-transitory computer-readable medium described herein, transmitting the control information may include operations, features, means, or instructions for transmitting the control information in a first bandwidth that may be different from a second bandwidth used to transmit one or more synchronization signal blocks to the wireless repeater.

In some examples of the method, apparatuses, and non-transitory computer-readable medium described herein, the control information may be transmitted over a physical downlink control channel.

A method of wireless communication at a wireless repeater is described. The method may include identifying a first base station and a second base station, receiving, from the first base station, control information for communicating with one or more UEs connected to the second base station via the wireless repeater, and communicating with one or more UEs based on the control information.

An apparatus for wireless communication at a wireless repeater is described. The apparatus may include a processor, memory coupled with the processor, and instructions stored in the memory. The instructions may be executable by the processor to cause the apparatus to identify a first base station and a second base station, receive, from the first base station, control information for communicating with one or more UEs connected to the second base station via the wireless repeater, and communicate with one or more UEs based on the control information.

Another apparatus for wireless communication at a wireless repeater is described. The apparatus may include means for identifying a first base station and a second base station, receiving, from the first base station, control information for communicating with one or more UEs connected to the second base station via the wireless repeater, and communicating with one or more UEs based on the control information.

A non-transitory computer-readable medium storing code for wireless communication at a wireless repeater is described. The code may include instructions executable by a processor to identify a first base station and a second base station, receive, from the first base station, control information for communicating with one or more UEs connected to the second base station via the wireless repeater, and communicate with one or more UEs based on the control information.

Some examples of the method, apparatuses, and non-transitory computer-readable medium described herein may further include operations, features, means, or instructions for determining that the first base station may be a primary base station that controls the wireless repeater, and monitoring for control information from the first base station based on the determination, where the control information may be received from the first base station based on the monitoring.

Some examples of the method, apparatuses, and non-transitory computer-readable medium described herein may further include operations, features, means, or instructions for refraining from monitoring for other control information from the second base station based on the determination.

In some examples of the method, apparatuses, and non-transitory computer-readable medium described herein, identifying the first base station and the second base station may include operations, features, means, or instructions for receiving a first set of synchronization signal blocks from the first base station and a second set of synchronization signal blocks from the second base station, identifying the first base station based on the first set of synchronization signal blocks, and identifying the second base station based on the second set of synchronization signal blocks.

In some examples of the method, apparatuses, and non-transitory computer-readable medium described herein, the control information includes an indication of at least one directional beam for communicating with the one or more UEs, a transmission direction, or any combination thereof.

In some examples of the method, apparatuses, and non-transitory computer-readable medium described herein, receiving the control information may include operations, features, means, or instructions for receiving the control information in a portion of a bandwidth used to receive one or more synchronization signal blocks from the first base station.

In some examples of the method, apparatuses, and non-transitory computer-readable medium described herein, the control information may be received over a physical downlink control channel.

In some examples of the method, apparatuses, and non-transitory computer-readable medium described herein, receiving the control information may include operations, features, means, or instructions for receiving the control information in a first bandwidth that may be different from a second bandwidth used to receive one or more synchronization signal blocks from the first base station.

A method of wireless communication at a first base station is described. The method may include identifying a second base station that is connected to a first set of one or more UEs via a wireless repeater, determining a control signaling pattern based on identifying the second base station, and transmitting, to the wireless repeater, control information for the wireless repeater to communicate with a second set of one or more UEs connected to the first base station via the wireless repeater, the control information transmitted in accordance with the control signaling pattern.

An apparatus for wireless communication at a first base station is described. The apparatus may include a processor, memory coupled with the processor, and instructions stored in the memory. The instructions may be executable by the processor to cause the apparatus to identify a second base station that is connected to a first set of one or more UEs via a wireless repeater, determine a control signaling pattern based on identifying the second base station, and transmit, to the wireless repeater, control information for the wireless repeater to communicate with a second set of one or more UEs connected to the first base station via the wireless repeater, the control information transmitted in accordance with the control signaling pattern.

Another apparatus for wireless communication at a first base station is described. The apparatus may include means for identifying a second base station that is connected to a first set of one or more UEs via a wireless repeater, determining a control signaling pattern based on identifying the second base station, and transmitting, to the wireless repeater, control information for the wireless repeater to communicate with a second set of one or more UEs connected to the first base station via the wireless repeater, the control information transmitted in accordance with the control signaling pattern.

A non-transitory computer-readable medium storing code for wireless communication at a first base station is described. The code may include instructions executable by a processor to identify a second base station that is connected to a first set of one or more UEs via a wireless repeater, determine a control signaling pattern based on identifying the second base station, and transmit, to the wireless repeater, control information for the wireless repeater to communicate with a second set of one or more UEs connected to the first base station via the wireless repeater, the control information transmitted in accordance with the control signaling pattern.

In some examples of the method, apparatuses, and non-transitory computer-readable medium described herein, determining the control signaling pattern may include operations, features, means, or instructions for configuring a first time period for transmitting the control information to the wireless repeater, and configuring a second time period for the second base station to transmit second control information to the wireless repeater, where the control signaling pattern includes the first time period and the second time period.

In some examples of the method, apparatuses, and non-transitory computer-readable medium described herein, the first time period and the second time period may be non-overlapping. In some examples of the method, apparatuses, and non-transitory computer-readable medium described herein, the first time period and the second time period may be based on communicating with the second base station.

In some examples of the method, apparatuses, and non-transitory computer-readable medium described herein, transmitting the control information may include operations, features, means, or instructions for transmitting the control information in a portion of a bandwidth used to transmit one or more synchronization signal blocks to the wireless repeater.

In some examples of the method, apparatuses, and non-transitory computer-readable medium described herein, the portion of the bandwidth includes a first bandwidth part that may be the same as a second bandwidth part used by the second base station for transmitting second control information.

In some examples of the method, apparatuses, and non-transitory computer-readable medium described herein, the first base station may be associated with a first identifier that may be different from a second identifier associated with the second base station. In some examples of the method, apparatuses, and non-transitory computer-readable medium described herein, the first identifier includes a first radio network temporary identifier and the second identifier includes a second radio network temporary identifier.

A method of wireless communication at a wireless repeater is described. The method may include identifying a first base station and a second base station, receiving, from the first base station, first control information for communicating with a first set of one or more UEs connected to the first base station via the wireless repeater, and receiving, from the second base station, second control information for communicating with a second set of one or more UEs connected to the second base station via the wireless repeater, the first control information and the second control information being received in accordance with a control signaling pattern.

An apparatus for wireless communication at a wireless repeater is described. The apparatus may include a processor, memory coupled with the processor, and instructions stored in the memory. The instructions may be executable by the processor to cause the apparatus to identify a first base station and a second base station, receive, from the first base station, first control information for communicating with a first set of one or more UEs connected to the first base station via the wireless repeater, and receive, from the second base station, second control information for communicating with a second set of one or more UEs connected to the second base station via the wireless repeater, the first control information and the second control information being received in accordance with a control signaling pattern.

Another apparatus for wireless communication at a wireless repeater is described. The apparatus may include means for identifying a first base station and a second base station, receiving, from the first base station, first control information for communicating with a first set of one or more UEs connected to the first base station via the wireless repeater, and receiving, from the second base station, second control information for communicating with a second set of one or more UEs connected to the second base station via the wireless repeater, the first control information and the second control information being received in accordance with a control signaling pattern.

A non-transitory computer-readable medium storing code for wireless communication at a wireless repeater is described. The code may include instructions executable by a processor to identify a first base station and a second base station, receive, from the first base station, first control information for communicating with a first set of one or more UEs connected to the first base station via the wireless repeater, and receive, from the second base station, second control information for communicating with a second set of one or more UEs connected to the second base station via the wireless repeater, the first control information and the second control information being received in accordance with a control signaling pattern.

Some examples of the method, apparatuses, and non-transitory computer-readable medium described herein may further include operations, features, means, or instructions for monitoring, based on the control signaling pattern, a first time period for receiving the first control information from the first base station and a second time period for receiving the second control information from the second base station, where the first control information and the second control information may be received based on the monitoring.

In some examples of the method, apparatuses, and non-transitory computer-readable medium described herein, the first time period and the second time period may be non-overlapping. In some examples of the method, apparatuses, and non-transitory computer-readable medium described herein, receiving the first control information may include operations, features, means, or instructions for receiving the first control information in a first portion of a bandwidth used to receive one or more synchronization signal blocks from the first base station. In some examples of the method, apparatuses, and non-transitory computer-readable medium described herein, receiving the second control information includes receiving the second control information in a second portion of the bandwidth used to receive one or more synchronization signal blocks from the second base station.

In some examples of the method, apparatuses, and non-transitory computer-readable medium described herein, the first portion and the second portion include a same bandwidth part. In some examples of the method, apparatuses, and non-transitory computer-readable medium described herein, the first base station may be associated with a first identifier that may be different from a second identifier associated with the second base station. In some examples of the method, apparatuses, and non-transitory computer-readable medium described herein, the first identifier includes a first radio network temporary identifier and the second identifier includes a second radio network temporary identifier.

DETAILED DESCRIPTION

Figure 1:
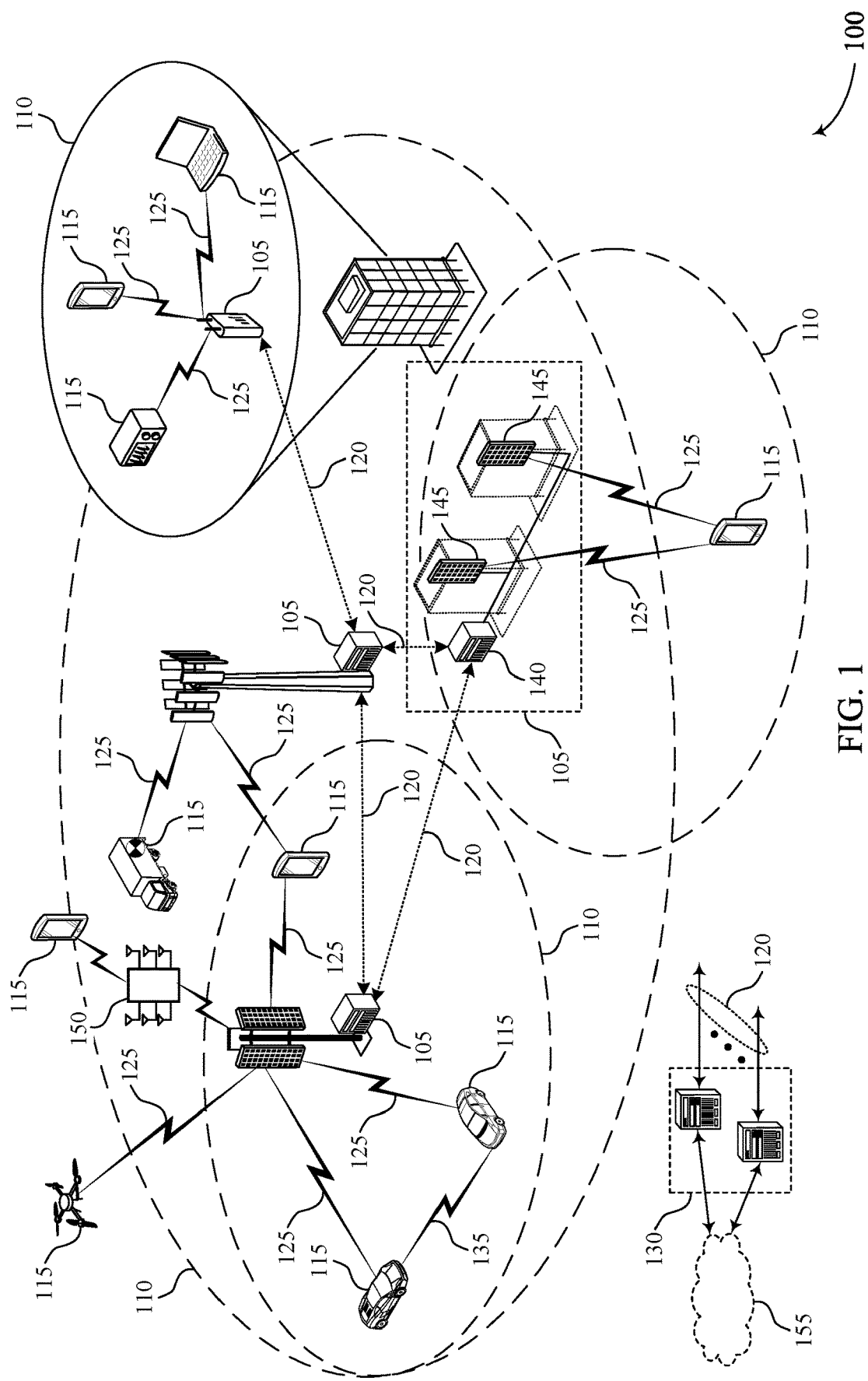
FIG. 1 illustrates an example of a wireless communications system that supports techniques for connecting user equipment (UEs) with multiple base stations through a wireless repeater in accordance with various aspects of the present disclosure.

In a wireless communications system, a base station may communicate with a user equipment (UE) over a wireless link. For example, base stations and UEs may operate in millimeter wave (mmW) frequency ranges, e.g., 28 gigahertz (GHz), 40 GHz, 60 GHz, etc. Wireless communications at these frequencies may be associated with increased signal attenuation (e.g., pathloss), which may be influenced by various factors, such as temperature, barometric pressure, diffraction, blockage by physical objects, etc. As a result, signal processing techniques, such as beamforming, may be used to coherently combine energy and overcome the pathlosses at these frequencies. However, the transmission of a signal (such as a beamformed signal) between the base station and the UE may not be possible or may be interfered with due to a physical barrier or a radio frequency (RF) jammer. In these cases, a repeating device (e.g., a wireless repeater, a mmW repeater, or the like) may be used to extend, repeat, or relay the transmission from the base station to the UE and vice versa, thereby enabling efficient communications in the presence of RF jammers.

In some examples, a wireless repeater may be controlled by a base station that indicates how the repeater is to communicate with one or more UEs and the base station. The base station may provide control signaling that indicates, for example, some beam (e.g., a directional beam or symbol period associated with a beam), a communication direction (e.g., uplink, downlink) for transmissions, or other types of information the repeater may use to communicate with the base station and UEs.

In some systems, a wireless repeater may be near multiple base stations that are each connected to a respective set of one or more UEs. In such cases, each UE may communicate with a base station via the repeater. For example, a first UE may be connected to a first base station, and transmissions between the first UE and first base station may be communicated via the wireless repeater. Likewise, a second UE may communicate with a second base station in the same way. However, communicating control information associated with the repeater's functionality may introduce complexities to the system. For example, the repeater may be unable to simultaneously receive control information from different base stations (e.g., that are in different directions) due to the directionality of the beams used for transmitting and receiving control signaling. Likewise, the repeater may be unable prioritize communications for different devices without coordination and control information from the base stations. As such, providing control information to a repeater that is in communication with multiple devices may be complex.

The described techniques for transmitting control signaling to a wireless repeater from multiple base stations may enable the efficient control of the repeater for communicating with UEs connected to different base stations. For example, two or more base stations may coordinate control signaling for the wireless repeater, where one base station may act as a primary base station that transmits control information to the repeater on behalf of both base stations. More specifically, a first base station (e.g., the primary base station) may receive, from a second base station, information for controlling the wireless repeater and the first base station may signal the information associated with the second base station to the repeater. Here, the base stations may coordinate and configure the control information over a backhaul link. Further, the repeater may identify the first base station as the primary base station, and the repeater may monitor for control information from the primary base station. As such, the wireless repeater may avoid monitoring for control information from base stations not identified as the primary base station, thereby limiting the operations performed by the wireless repeater to receive control information from different base stations (e.g., form receive beams in multiple different directions and at different times).

In another example, the base stations may each transmit control information to the repeater, where configured and coordinated transmission times may be used by the base stations to transmit the control information in accordance with a control signaling pattern. In such cases, the repeater may be configured with time intervals (e.g., periodic time intervals) that direct the repeater to receive the control signaling from each base station during respective time intervals, where the signaling may be differentiated for each base station based on an identifier. In one example, the time periods for receiving the control signaling may be time division multiplexed, where a first base station may transmit control information during a first time period and a second base station may transmit control information during a second, different time period, and so forth. As a result, a wireless repeater may be controlled by multiple different base stations to ensure communications between each base station and their respective UEs. Further, the control signaling pattern may enable the wireless repeater to efficiently form receive beams in respective directions corresponding to each time period (and each base station).

Aspects of the disclosure are initially described in the context of wireless communications systems. Further examples are then described with reference to a process flow that illustrates the efficient communication of control information to a wireless repeater by multiple base stations. Aspects of the disclosure are further illustrated by and described with reference to apparatus diagrams, system diagrams, and flowcharts that relate to techniques for connecting UEs with multiple base stations through a wireless repeater.

FIG. 1 illustrates an example of a wireless communications system 100 that supports techniques for connecting a wireless repeater to multiple base stations in accordance with various aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. In some examples, base station 105 may wirelessly communicate with one or more wireless repeaters 150 (e.g., repeating devices, repeaters, or other like terminology) that may support the retransmission, amplification, frequency translation, etc. of signaling to one or more other devices, such as a UE 115. Similarly, a wireless repeater 150 may be used to retransmit signaling from a UE 115 to a base station 105.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with some bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

A wireless device (such as a UE 115, a wireless repeater 150, or the like) attempting to access a wireless network may perform an initial cell search by detecting a primary synchronization signal (PSS) from a base station 105. The PSS may enable synchronization of slot timing and may indicate a physical layer identity value. The wireless device may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. In some cases, a base station 105 may transmit synchronization signals (e.g., PSS SSS, and the like) using multiple beams in a beam-sweeping manner through a cell coverage area. In some cases, PSS, SSS, or broadcast information (e.g., a physical broadcast channel (PBCH)) may be transmitted within different synchronization signal blocks (SSBs) on respective directional beams, where one or more SSBs may be included within a synchronization signal burst.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, a wireless repeater 150 may be an MTC or IoT device that is controlled by a base station 105 or UE 115 via a low-band or NB-IoT connection and performs repeating of received signals without demodulation or decoding of such signals based on control information provided by the low-band or NB-IoT connection.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing 2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 155. The operators IP services 155 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may include one or more wireless repeaters 150 (e.g., wireless repeaters 150). Wireless repeaters 150 may include functionality to repeat, extend, and redirect wireless signals transmitted within a wireless communications system. In some cases, wireless repeaters 150 may be used in line-of-sight (LOS) or non-line-of-sight (NLOS) scenarios. In an LOS scenario, directional (e.g., beamformed) transmissions, such as mmW transmissions, may be limited by path-loss through air. In a NLOS scenario, such as in an urban area or indoors, mmW transmissions may be limited by signal blocking or signal interfering physical objects. In either scenario, a wireless repeater 150 may be used to receive a signal from a base station 105 and transmit a signal to UE 115, or receive a signal from a UE 115 and transmit the signal to the base station 105. Beamforming, filtering, gain control, and phase correction techniques may be utilized by the wireless repeater 150 to improve signal quality and avoid RF interference with the transmitted signal. Phase rotation adjustment may be applied by the wireless repeater 150 to the signal to correct for phase rotation error caused by the frequency translation by the wireless repeater 150.

Wireless communications system 100 may support the transmission of control information to a wireless repeater 150 from multiple base stations 105, which may enable the wireless repeater 150 to communicate with UEs 115 associated with each base station 105. As an example, a wireless repeater 150 may be in communication with (e.g., receive SSBs from) two or more base stations 105 that are connected to respective sets of UEs 115. In some cases, the wireless repeater 150 may identify a first base station 105 from the two or more base stations 105 as a primary base station 105, and the wireless repeater 150 may monitor for control information from the primary base station 105 (e.g., while refraining from monitoring for transmissions and control signaling from other base stations 105). The primary base station 105 may transmit control information to the wireless repeater 150, where the control information may include control information (e.g., mmW beam information, communication direction (i.e., uplink or downlink) information, or the like) from a second base station 105, and the control information may be used by the wireless repeater 150 to communicate with one or more UEs 115 connected to the second base station 105. In some examples, the primary base station 105 may receive an indication of the control information from the second base station 105 via a backhaul link, and the primary base station 105 may transmit the control information to the wireless repeater 150 on behalf of the second base station 105 and based on the received indication. In such cases, the base stations 105 may efficiently communicate with each other for the coordination of control signaling to the wireless repeater 150. As a result, the wireless repeater 150 may receive control information from the first base station 105, the second base station 105, or both, by monitoring for transmissions from the primary base station 105.

In other examples, the wireless repeater 150 may use a configuration for monitoring for control information from each of the two or more base stations 105. For example, the wireless repeater 150 may be configured with a pattern for monitoring for control signaling from the first base station 105 and the second base station 105. The pattern may include periodic time intervals during which the wireless repeater 150 monitors for control information from respective base stations 105 (e.g., a first time interval for control signaling from the first base station 105 and a second time interval for control signaling from the second base station 105). As a result, the wireless repeater 150 may monitor for control information from multiple base stations 105 and may communicate with UEs 115 connected to each base station 105 based on control information received during the time intervals.

Figure 2:
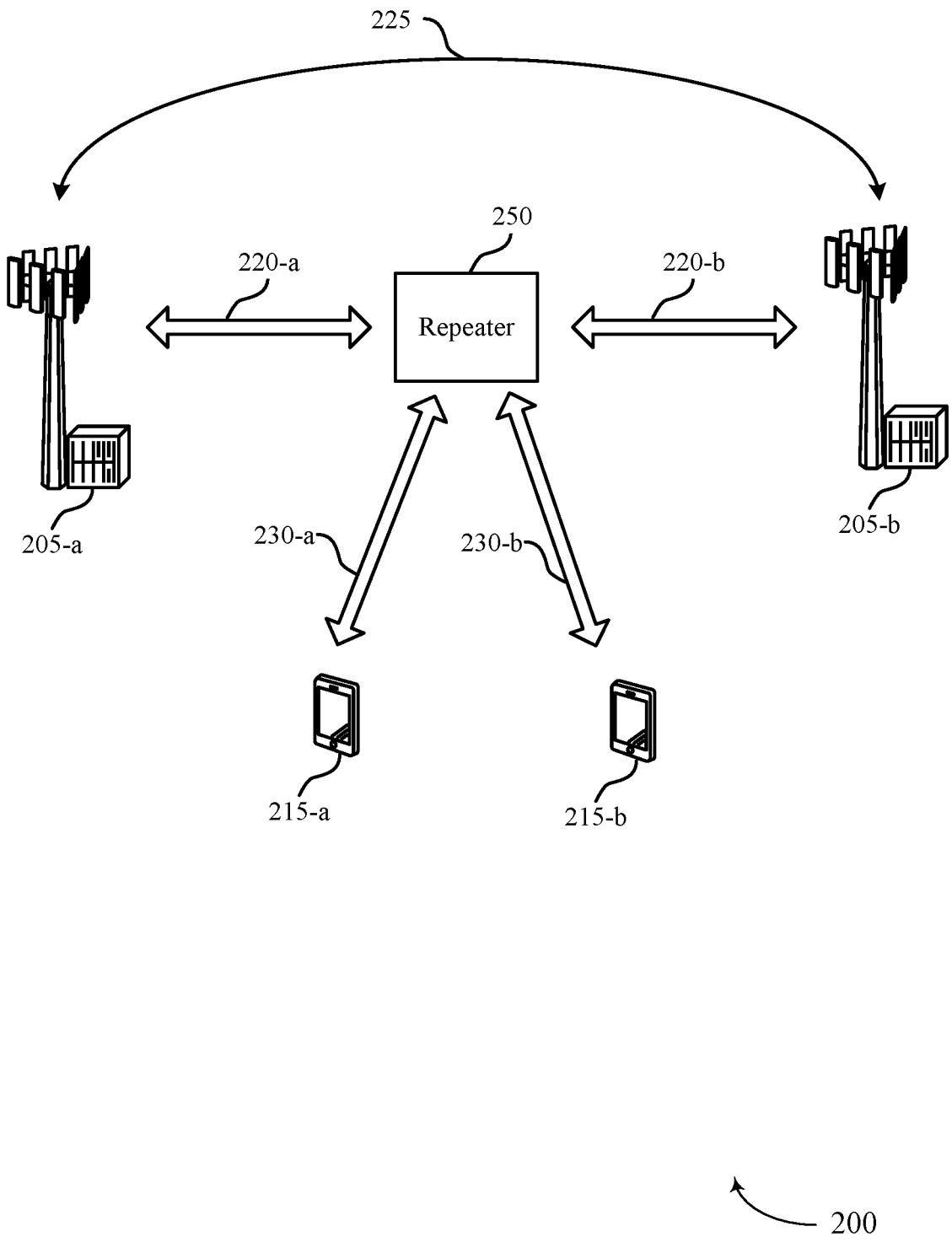
FIG. 2 illustrates an example of a wireless communications system that supports techniques for connecting UEs with multiple base stations through a wireless repeater in accordance with various aspects of the present disclosure.

FIG. 2 illustrates an example of a wireless communications system 200 that supports techniques for connecting UEs with multiple base stations through a wireless repeater in accordance with various aspects of the present disclosure. In some examples, wireless communications system 200 may implement aspects of wireless communications system 100. As shown, wireless communications system 200 includes base station 205-*a*, base station 205-*b*, UE 215-*a*, and UE 215-*b*, which may be examples of the corresponding devices described with reference to FIG. 1. Wireless communications system 200 also includes wireless repeater 250, which may be used to repeat transmissions between the other devices within wireless communications system 200.

In wireless communications system 200, base station 205-*a* may connect to a wireless repeater 250. For example, base station 205-*a* may send transmissions (e.g., SSBs, data, control information) over directional beams via communication link 220-*a* to wireless repeater 250. In some examples, an SSB may be transmitted in respective symbol periods, and each symbol period and SSB may correspond to a different beam direction. Wireless repeater may also be connected to base station 205-*b*, where base station 205-*b* may send transmissions over communication link 220-*b* to wireless repeater 250. In some examples, base station 205-*a* may communicate with base station 205-*b* via a backhaul link 225.

Each base station 205 may be connected to one or more UEs 215 through wireless repeater 250. For example, UE 215-*a* may be connected to either base station 205-*a* or base station 205-*b*, where the connection to one or both of the base stations 205 may be provided through wireless repeater 250. Likewise, UE 215-*a* may be connected, via wireless repeater 250, to base station 205-*a* or base station 205-*b*, or both. Alternatively, respective sets of UEs 215 may be connected to different base stations 205 via wireless repeater 250. As an example, UE 215-*a* may be from a set of one or more UEs 215 that are connected to base station 205-*a*, whereas UE 215-*b* may be from a set of one or more UEs 215 connected to base station 205-*b* via wireless repeater 250. Additionally, UE 215-*b* may not be connected to base station 205-*a* (which may be based on mobility prediction or other factors). As an example, UE 215-*b* may have an additional link with base station 205-*b* and may be unable to connected to base station 205-*a*.

Wireless repeater 250 may amplify and forward the transmissions it receives (e.g., from base station 205-*a*, base station 205-*b*, UE 215-*a*, or UE 215-*b*) in wireless communications system 200. For example, wireless repeater 250 may forward transmissions from base station 205-*a* to one or more UEs 215 that are connected to base station 205-*a* via communication links 220 and communication links 230, and vice versa. As described herein, each communication link 220 and each communication link 230 may be an example of beamformed communications between wireless repeater 250 and a base station 205 or between wireless repeater 250 and a UE 215, respectively.

In some examples, base station 205-*a* or base station 205-*b* may control wireless repeater 250 using control information transmitted via a control interface (e.g., an in-band or out-of-band control interface). Here, an in-band control interface may include control information signaled within a portion of a wideband (e.g., wide signal bandwidth) transmission, which may include a BWP of the wideband bandwidth. In some cases, the wideband bandwidth may be the same bandwidth that wireless repeater 250 uses to communicate with base station 205-*a* (e.g., for receiving SSBs). An out-of-band control interface may refer to control signaling transmitted over a different bandwidth or RF spectrum band than is used to transmit/receive the SSBs, where the control signaling may be sent to wireless repeater 250 separate from other transmissions. In some cases, control information may be transmitted via a physical downlink control channel (PDCCH).

The control information received by wireless repeater 250 may relate to the selection of beams and also provide instructions for transmitting in the uplink or downlink (e.g., with a UE 215 or with a base station 205). For example, the control information may include power control, timing control, power saving, or beam weights, and the control information may indicate whether wireless repeater is to communicate in the uplink by forwarding a transmission from a UE 215 to a base station 205 or in the downlink by forwarding a transmission from a base station 205 to a UE 215. Wireless repeater 250 may accordingly use the control information received via the control interface to set a beam direction for communicating with the base station 205 and one or more UEs 215 connected to the base station 205.

In some cases, wireless repeater 250 may be unable to simultaneously receive control information from multiple base stations 205. As described herein, techniques may, however, be implemented to enable multiple base stations 205 to provide control information to wireless repeater 250 to enable communications between the UEs 215 and base stations 205 of wireless communications system 200.

In a first example, wireless repeater 250 may treat base station 205-*a* as a primary base station 205 and may monitor the control interface from base station 205-*a* based on the identification of base station 205-*a* as the primary base station 205. Additionally, wireless repeater 250 may not monitor for control information from other base stations 205 (e.g., base station 205-*b*). In such cases, base station 205-*a* may assign the downlink and uplink communications direction or the beams that enable wireless repeater 250 to forward communications between UE 215-*a* or UE 215-*b* and the respective base station 205 to which each UE 215 is connected. In other words, base station 205-*a* may provide control information to wireless repeater 250 on behalf of one or more other base stations 205 (e.g., including base station 205-*b*).

Base station 205-*a* may receive, from other base stations 205, an indication of the control information to be signaled to wireless repeater 250. For example, base station 205-*a* and base station 205-*b* may be coupled via backhaul link 225 and may coordinate the signaling of control information to wireless repeater 250 over the backhaul link 225. The coordination may include base station 205-*b* providing an indication of control information and scheduling information for communicating with one or more UEs 215 through wireless repeater 250. Base station 205-*a* may receive the indication, and base station 205-*b* transmit the control information to wireless repeater 250 over the control interface. As a result, the control information transmitted to wireless repeater 250 from base station 205-*a* may include control information associated with base station 205-*b*. The control information may enable control of wireless repeater 250 by base station 205-*b* such that base station 205-*b* may communicate with one or more UEs 215 (e.g., via wireless repeater 250). In some examples, the control information sent by base station 205-*a* may also include information used by base station 205-*a* to communicate with one or more UEs 215.

In a second example, wireless repeater 250 may monitor the control interface (e.g., an in-band PDCCH) for control information transmitted from multiple base stations 205, including base station 205-*a* and base station 205-*b*. In such cases, base station 205-*a* and base station 205-*b* may each transmit control information to wireless repeater 250 in accordance with a control signaling pattern. The control signaling pattern may indicate resources used by each base station 205 on which control information may be transmitted to wireless repeater 250.

The control information transmitted by each base station 205 may be sent within a same BWP of the control interface. As such, wireless repeater 250 may monitor a same BWP for control information transmitted by base station 205-*a* and base station 205-*b*. In some examples, an identifier (ID), such as a physical (PHY) layer ID (e.g., radio network temporary identifier (RNTI)) for base station 205-*a* and base station 205-*b* may be different, where the ID may enable wireless repeater 250 to differentiate between control information transmitted by each base station 205. The control signaling pattern may enable wireless repeater 250 to identify when (and on which resources) to monitor for control information being sent from different base stations 205.

In some examples, the control signaling pattern may be configured to coordinate the signaling of control information sent by each base station 205. As an example, wireless repeater 250 may receive control information from base station 205-*a* and base station 205-*b* in a TDM manner. For example, base station 205-*a* may transmit control information during a first time period (e.g., a slot, a symbol period, etc.) and base station 205-*b* may transmit control information during a second, different time period (e.g., another slot, another symbol period, etc.). The TDM pattern (e.g., period of time for control signaling) may be configured between base station 205-*a* and base station 205-*b* (e.g., over backhaul link 225, or via other signaling). In other cases, the control signaling pattern may be predetermined. In some examples, base station 205-*a* and base station 105-*b* may have an aperiodic configuration for the resources during which wireless repeater 250 may monitor for control information from the base stations 205. In such cases, wireless repeater 250 may, for example, monitor for control information from base station 205-*a* during even slots (e.g., according to a slot index) and monitor for control information from base station 205-*b* during odd slots. It is noted that other configurations and patterns of resources used to receive control signaling not explicitly described herein are also possible.

Figure 3:
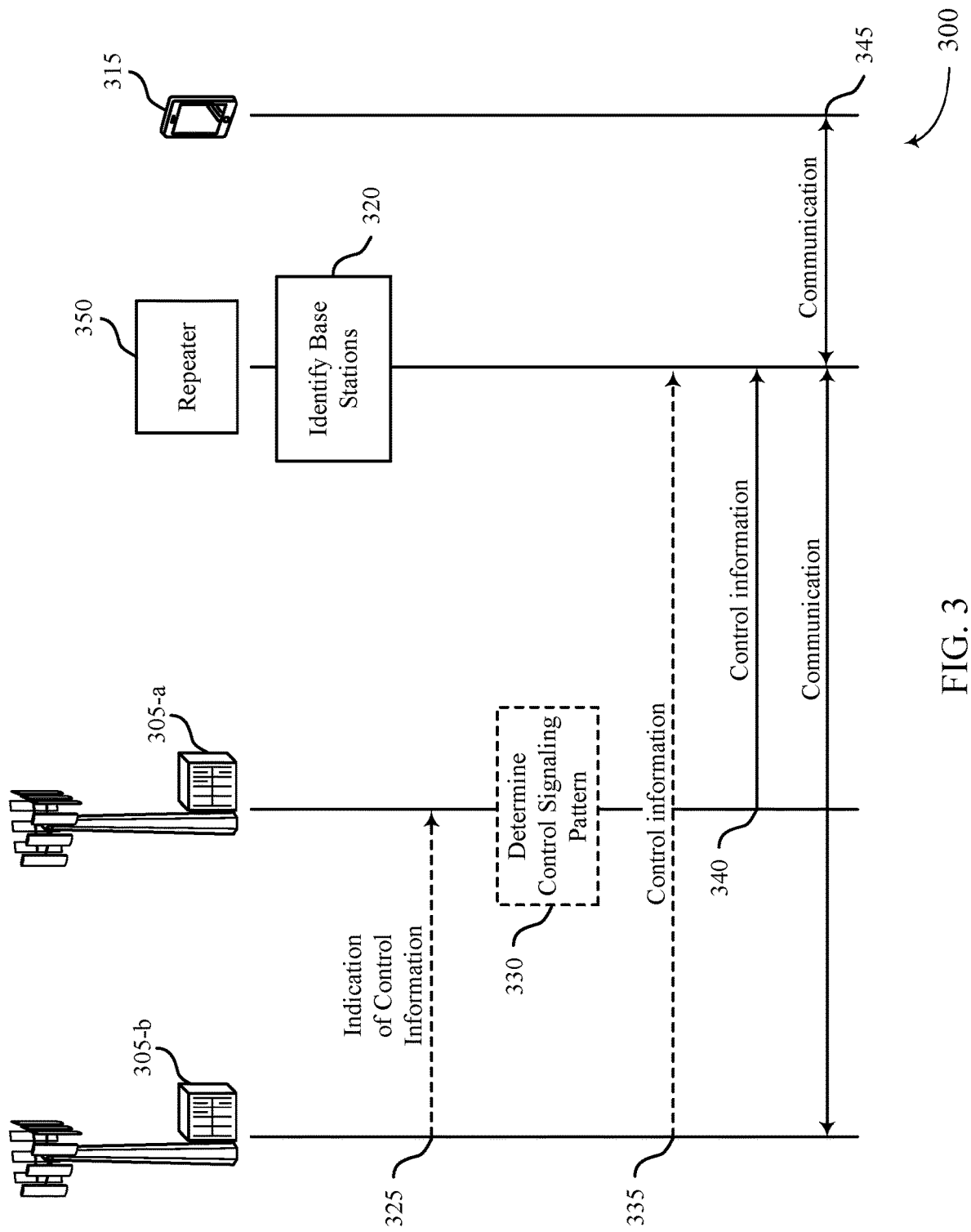
FIG. 3 illustrates an example of a process flow in a system that supports techniques for connecting UEs with multiple base stations through a wireless repeater in accordance with various aspects of the present disclosure.

FIG. 3 illustrates an example of a process flow 300 in a system that supports techniques for connecting UEs with multiple base stations through a wireless repeater in accordance with various aspects of the present disclosure. In some examples, process flow 300 may implement aspects of wireless communications system 100 or wireless communications system 200. For example, process flow 300 may include base station 305-*a*, base station 305-*b*, UE 315 and wireless repeater 350, which may be examples of the corresponding devices described with reference to FIG. 1 and FIG. 2. Alternative examples of the following may be implemented where some processes are performed in a different order than described or not performed at all. In some implementations, processes may include additional features not mentioned below, or further processes may be added.

At 320, wireless repeater 350 may identify base station 305-*a* and base station 305-*b*. For example, wireless repeater 350 may receive SSBs from, or be in communication with, base station 305-*a* and base station 305-*b*. At 325, base station 305-*a* may optionally receive, from base station 305-*b*, an indication of control information for wireless repeater 350 to communicate with UE 315 (or other UEs that are connected to base station 305-*b*). The indication of the control information may be received over a backhaul link between base station 305-*a* and base station 305-*b*. The control information may include an indication of a directional beam for wireless repeater 350 to communicate with UE 315 or other UEs and may further indicate if the communications are for uplink transmissions or downlink transmissions.

In some examples, at 330, base station 305-*a* may optionally determine a control signaling pattern based on identifying that base station 305-*b* is connected to UE 315 via wireless repeater 350. In some examples, the control signaling pattern may include different time periods that base station 305-*b* and base station 305-*a* may use for transmitting control information to wireless repeater 350.

Based on the control signaling pattern determined at 330, both base station 305-*a* and base station 305-*b* may transmit control information to wireless repeater 350. For example, at 340, base station 305-*a* may transmit control information for wireless repeater 350 to communicate with UE 315, where the control information may be transmitted in accordance with the determined control signaling pattern. Likewise, base station 305-*a* may transmit control information to wireless repeater 350 in accordance with the control signaling pattern, which may be used to enable communications between base station 305-*a* and a UE.

Additionally or alternatively, at 340, base station 305-*a* may transmit control information to wireless repeater 350 (e.g., acting as the primary base station 305). In such cases, wireless repeater 350 may accordingly monitor for control information from base station 305-*a* but not from base station 305-*b*. The control information transmitted by base station 305-*a* at 340 and received by wireless repeater 350, may include control information associated with base station 305-*b*, as indicated at 325.

At 345, the control information received at wireless repeater 350 may enable base station 305-*b* to communicate with UE 315 through wireless repeater 350. In such cases, wireless repeater 350 may receive control information from multiple base stations 305—either through a primary base station 305 (e.g., base station 305-*a*) or through a control signaling pattern in which base station 305-*a* and base station 305-*b* transmit control information—and wireless repeater 350 may communicate with one or more UEs 315 connected to the respective base stations 305.

Figure 4:
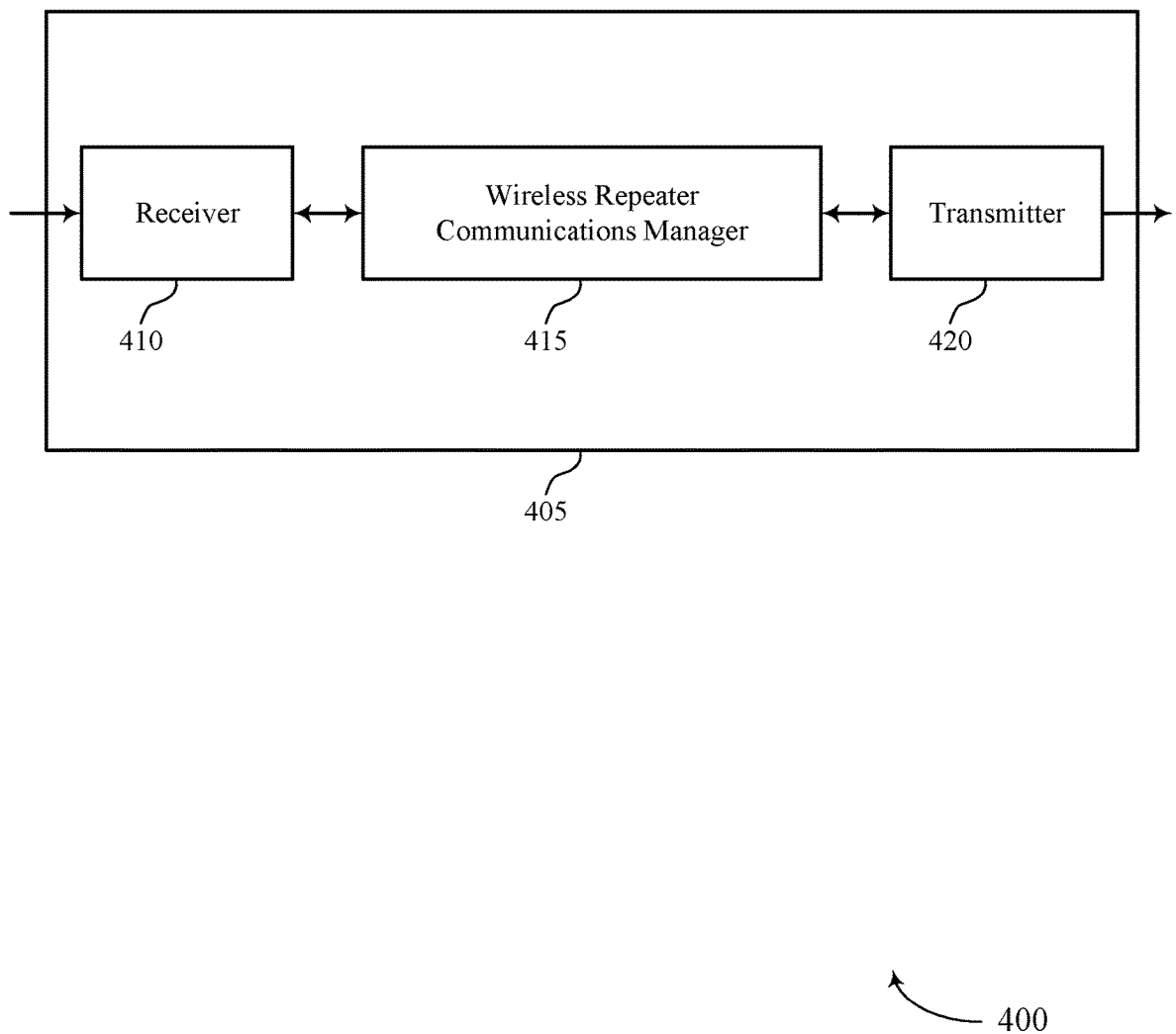
FIGS. 4 and 5 show block diagrams of devices that support techniques for connecting UEs with multiple base stations through a wireless repeater in accordance with various aspects of the present disclosure.

FIG. 4 shows a block diagram 400 of a device 405 that supports techniques for connecting UEs with multiple base stations through a wireless repeater in accordance with various aspects of the present disclosure. The device 405 may be an example of aspects of a wireless repeater (such as a wireless repeater 150 as shown in FIG. 1) as described herein. The device 405 may include a receiver 410, a wireless repeater communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for connecting UEs with multiple base stations through a wireless repeater, etc.). Information may be passed on to other components of the device 405. The receiver 410 may be an example of aspects of the transceiver 720 described with reference to FIG. 7. The receiver 410 may utilize a single antenna or a set of antennas.

The wireless repeater communications manager 415 may identify a first base station and a second base station, communicate with one or more UEs based on the control information, and receive, from the first base station, control information for communicating with one or more UEs connected to the second base station via the wireless repeater. The wireless repeater communications manager 415 may also identify a first base station and a second base station, receive, from the first base station, first control information for communicating with a first set of one or more UEs connected to the first base station via the wireless repeater, and receive, from the second base station, second control information for communicating with a second set of one or more UEs connected to the second base station via the wireless repeater, the first control information and the second control information being received in accordance with a control signaling pattern. The wireless repeater communications manager 415 may be an example of aspects of the wireless repeater communications manager 710 described herein.

The wireless repeater communications manager 415, or its sub-components, may be implemented in hardware, code (e.g., software or firmware) executed by a processor, or any combination thereof. If implemented in code executed by a processor, the functions of the wireless repeater communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The wireless repeater communications manager 415, or its sub-components, may be physically located at various positions, including being distributed such that portions of functions are implemented at different physical locations by one or more physical components. In some examples, the wireless repeater communications manager 415, or its sub-components, may be a separate and distinct component in accordance with various aspects of the present disclosure. In some examples, the wireless repeater communications manager 415, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The actions performed by the wireless repeater communications manager 415, as described herein, may be implemented to realize one or more potential advantages. For example, the wireless repeater communications manager 415 may efficiently receive control information from multiple base stations, and may therefore communicate with multiple UEs connected to each base station based on the received control information. This implementation may enable the wireless repeater to provide one or more UEs with enhanced coverage in a wireless system. In some cases, the wireless repeater communications manager 415 may receive control information from a primary base station, where the control information includes instructions from multiple base stations for forwarding signaling to/from respective UEs. This implementation may advantageously reduce complexity at a wireless repeater through the configuration of a beam pattern that enables the wireless repeater to efficiently detect signaling transmitted over a physical layer by a single base station but also process control information from multiple base stations. Additionally or alternatively, the wireless repeater may be configured to detect signaling from different base stations (and in different directions) through a coordinated and controlled beam pattern. By enabling the wireless repeater to connect UEs to their respective base stations using the described techniques, communications quality and reliability may be increased for various UEs that communicate with different base stations via the wireless repeater.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
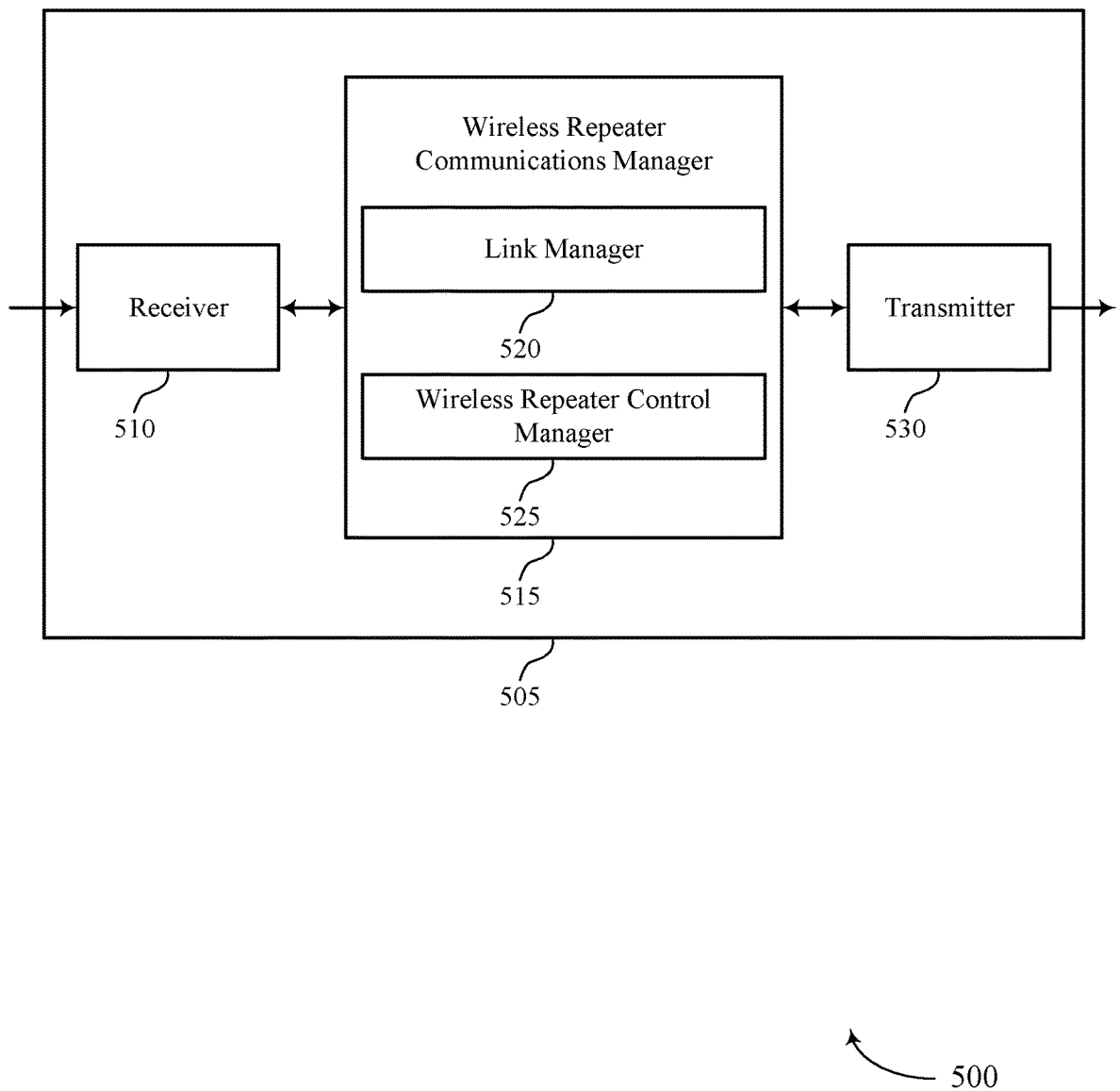

FIG. 5 shows a block diagram 500 of a device 505 that supports techniques for connecting UEs with multiple base stations through a wireless repeater in accordance with various aspects of the present disclosure. The device 505 may be an example of aspects of a device 405, or a wireless repeater as described herein. The device 505 may include a receiver 510, a wireless repeater communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to techniques for connecting UEs with multiple base stations through a wireless repeater, etc.). Information may be passed on to other components of the device 505. The receiver 510 may be an example of aspects of the transceiver 720 described with reference to FIG. 7. The receiver 510 may utilize a single antenna or a set of antennas.

The wireless repeater communications manager 515 may be an example of aspects of the wireless repeater communications manager 415 as described herein. The wireless repeater communications manager 515 may include a link manager 520 and a wireless repeater control manager 525. The wireless repeater communications manager 515 may be an example of aspects of the wireless repeater communications manager 710 described herein.

The link manager 520 may identify a first base station and a second base station and communicate with one or more UEs based on the control information. The wireless repeater control manager 525 may receive, from the first base station, control information for communicating with one or more UEs connected to the second base station via the wireless repeater. The link manager 520 may identify a first base station and a second base station.

The wireless repeater control manager 525 may receive, from the first base station, first control information for communicating with a first set of one or more UEs connected to the first base station via the wireless repeater and receive, from the second base station, second control information for communicating with a second set of one or more UEs connected to the second base station via the wireless repeater, the first control information and the second control information being received in accordance with a control signaling pattern.

The transmitter 530 may transmit signals generated by other components of the device 505. In some examples, the transmitter 530 may be collocated with a receiver 510 in a transceiver component. For example, the transmitter 530 may be an example of aspects of the transceiver 720 described with reference to FIG. 7. The transmitter 530 may utilize a single antenna or a set of antennas.

Based on configuring at least one beam pattern for connecting UEs to one or more base stations via a wireless repeater, a processor of the wireless repeater (e.g., controlling the receiver 510, the transmitter 530, or the transceiver 720 as described with reference to FIG. 7) may efficiently determine that where and when control information is to be expected from the base stations. Further, the processor of the wireless repeater may accordingly configure a beam pattern for receive instructions from one or more base stations, and further enable the transmission of information on behalf of respective sets of UEs. The processor of the wireless repeater may turn on one or more processing units to monitor for signaling, configure a beam pattern (e.g., for reception beams, transmission beams), identify control information within received signaling, or similar mechanisms within the wireless repeater. As such, when control signaling (e.g., control information within PDCCH) from another wireless device is received at the wireless repeater, the processor may be ready to respond more efficiently through the reduction of a ramp up in processing power.

Figure 6:
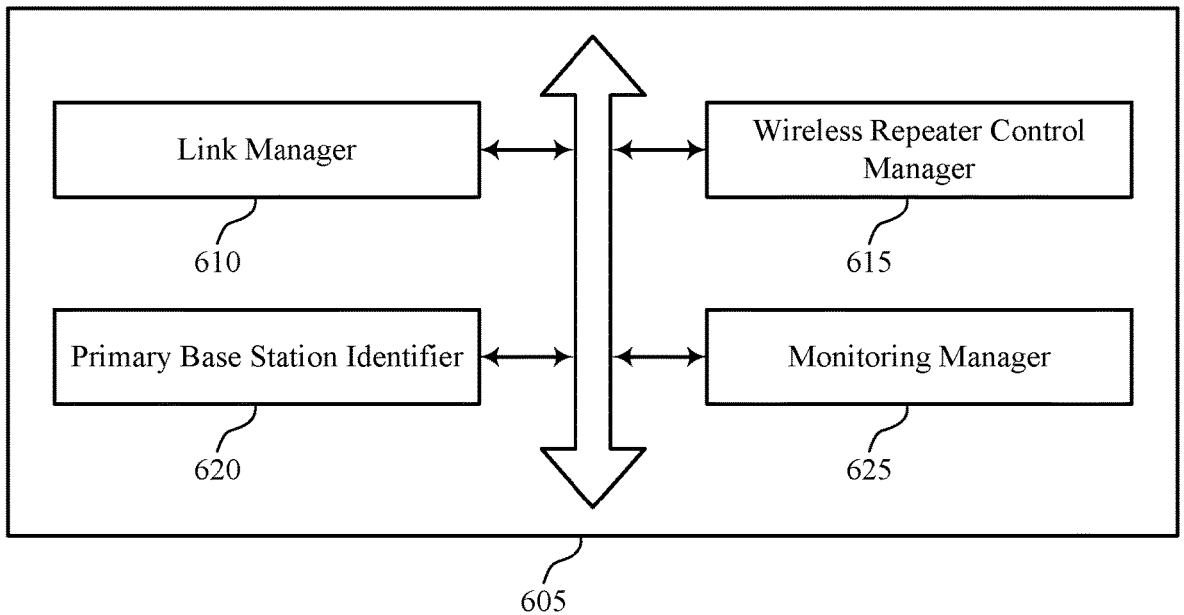
FIG. 6 shows a block diagram of a wireless repeater communications manager that supports techniques for connecting UEs with multiple base stations through a wireless repeater in accordance with various aspects of the present disclosure.

FIG. 6 shows a block diagram 600 of a wireless repeater communications manager 605 that supports techniques for connecting UEs with multiple base stations through a wireless repeater in accordance with various aspects of the present disclosure. The wireless repeater communications manager 605 may be an example of aspects of a wireless repeater communications manager 415, a wireless repeater communications manager 515, or a wireless repeater communications manager 710 described herein. The wireless repeater communications manager 605 may include a link manager 610, a wireless repeater control manager 615, a primary base station identifier 620, and a monitoring manager 625. Each of these components may communicate, directly or indirectly, with one another (e.g., via one or more buses).

The link manager 610 may identify a first base station and a second base station. In some examples, the link manager 610 may communicate with one or more UEs based on the control information. In some examples, the link manager 610 may identify a first base station and a second base station. In some examples, the link manager 610 may receive a first set of synchronization signal blocks from the first base station and a second set of synchronization signal blocks from the second base station.

In some examples, the link manager 610 may identify the first base station based on the first set of synchronization signal blocks. In some examples, the link manager 610 may identify the second base station based on the second set of synchronization signal blocks. In some cases, the first base station is associated with a first identifier that is different from a second identifier associated with the second base station. In some cases, the first identifier includes a first radio network temporary identifier and the second identifier includes a second radio network temporary identifier.

The wireless repeater control manager 615 may receive, from the first base station, control information for communicating with one or more UEs connected to the second base station via the wireless repeater. In some examples, the wireless repeater control manager 615 may receive, from the first base station, first control information for communicating with a first set of one or more UEs connected to the first base station via the wireless repeater. In some examples, the wireless repeater control manager 615 may receive, from the second base station, second control information for communicating with a second set of one or more UEs connected to the second base station via the wireless repeater, the first control information and the second control information being received in accordance with a control signaling pattern.

In some examples, the wireless repeater control manager 615 may receive the control information in a portion of a bandwidth used to receive one or more synchronization signal blocks from the first base station. In some examples, the wireless repeater control manager 615 may receive the control information in a first bandwidth that is different from a second bandwidth used to receive one or more synchronization signal blocks from the first base station. In some examples, receiving the first control information in a first portion of a bandwidth used to receive one or more synchronization signal blocks from the first base station.

In some examples, receiving the second control information includes receiving the second control information in a second portion of the bandwidth used to receive one or more synchronization signal blocks from the second base station. In some cases, the control information includes an indication of at least one directional beam for communicating with the one or more UEs, a transmission direction, or any combination thereof. In some cases, the control information is received over a physical downlink control channel. In some cases, the first portion and the second portion include a same bandwidth part.

The primary base station identifier 620 may determine that the first base station is a primary base station that controls the wireless repeater. The monitoring manager 625 may monitor for control information from the first base station based on the determination, where the control information is received from the first base station based on the monitoring. In some examples, the monitoring manager 625 may refrain from monitoring for other control information from the second base station based on the determination.

In some examples, the monitoring manager 625 may monitor, based on the control signaling pattern, a first time period for receiving the first control information from the first base station and a second time period for receiving the second control information from the second base station, where the first control information and the second control information are received based on the monitoring. In some cases, the first time period and the second time period are non-overlapping.

Figure 7:
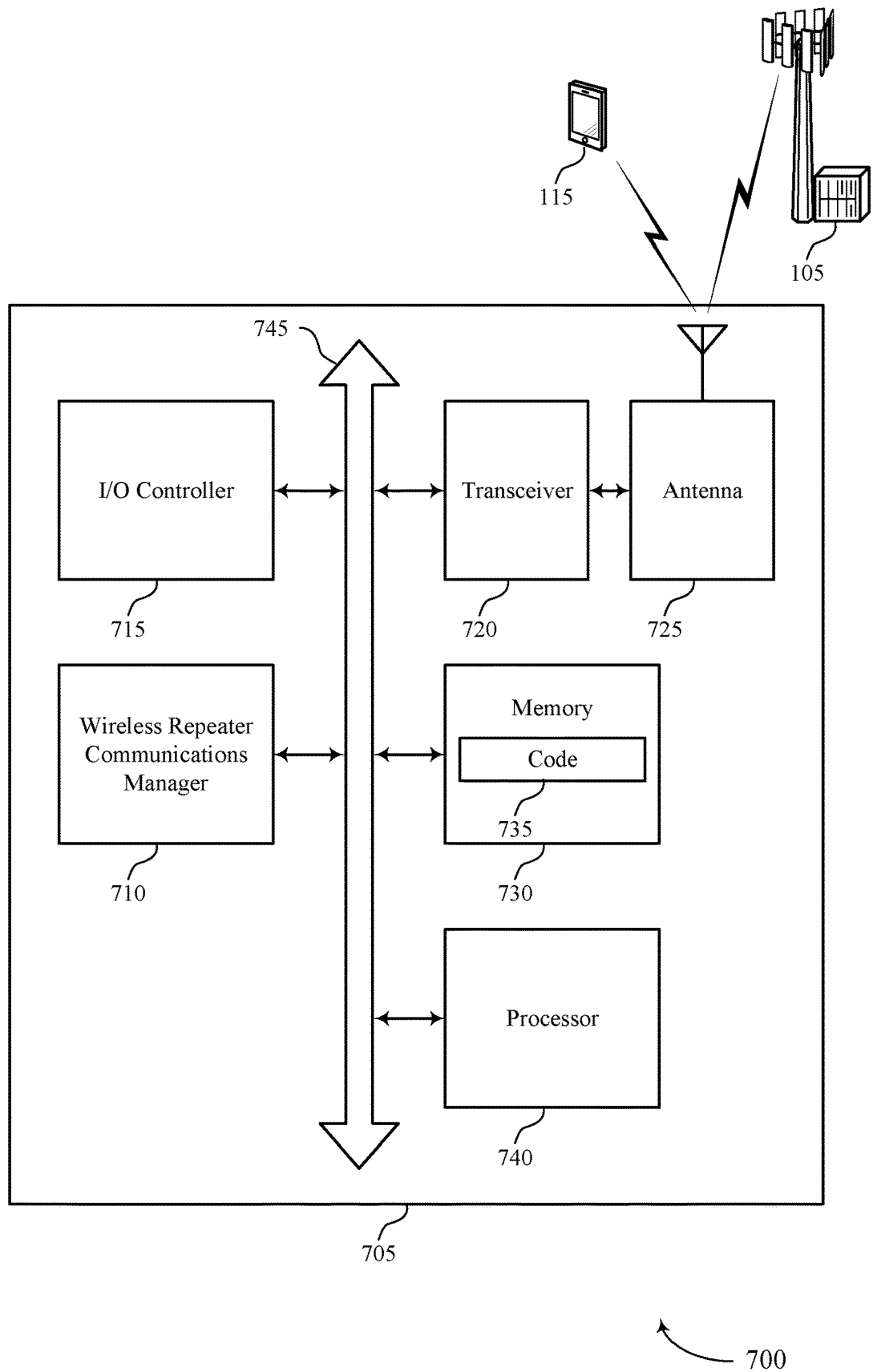
FIG. 7 shows a diagram of a system including a device that supports techniques for connecting UEs with multiple base stations through a wireless repeater in accordance with various aspects of the present disclosure.

FIG. 7 shows a diagram of a system 700 including a device 705 that supports techniques for connecting UEs with multiple base stations through a wireless repeater in accordance with various aspects of the present disclosure. The device 705 may be an example of or include the components of device 405, device 505, or a wireless repeater as described herein. The device 705 may include components for bi-directional voice and data communications including components for transmitting and receiving communications, including a wireless repeater communications manager 710, an I/O controller 715, a transceiver 720, an antenna 725, memory 730, and a processor 740. These components may be in electronic communication via one or more buses (e.g., bus 745).

The wireless repeater communications manager 710 may identify a first base station and a second base station, communicate with one or more UEs based on the control information, and receive, from the first base station, control information for communicating with one or more UEs connected to the second base station via the wireless repeater. The wireless repeater communications manager 710 may also identify a first base station and a second base station, receive, from the first base station, first control information for communicating with a first set of one or more UEs connected to the first base station via the wireless repeater, and receive, from the second base station, second control information for communicating with a second set of one or more UEs connected to the second base station via the wireless repeater, the first control information and the second control information being received in accordance with a control signaling pattern.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a digital signal processor (DSP), a CPU, a microcontroller, an ASIC, an field-programmable gate array (FPGA), a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for connecting UEs with multiple base stations through a wireless repeater).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
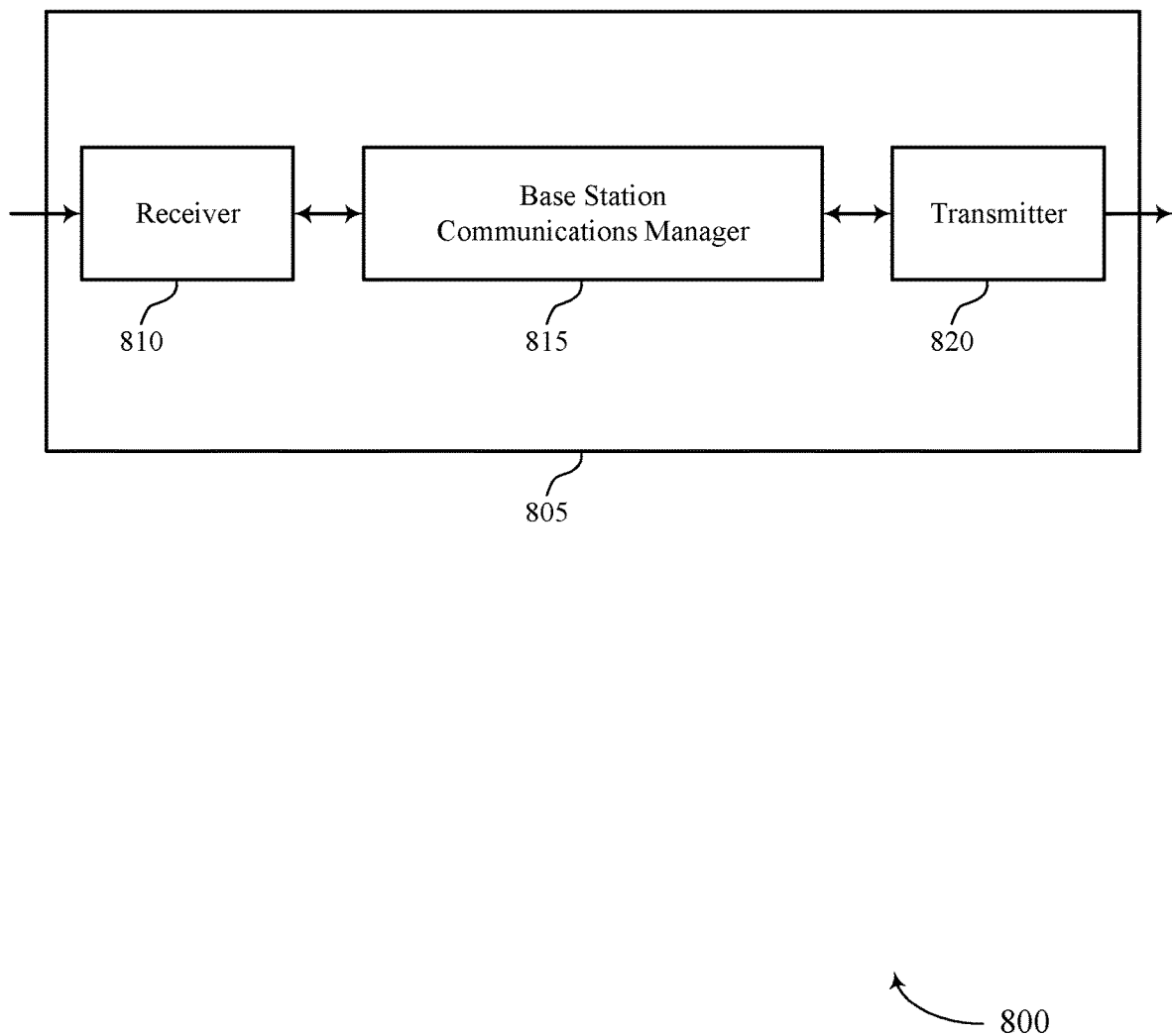
FIGS. 8 and 9 show block diagrams of devices that support techniques for connecting UEs with multiple base stations through a wireless repeater in accordance with various aspects of the present disclosure.

FIG. 8 shows a block diagram 800 of a device 805 that supports techniques for connecting UEs with multiple base stations through a wireless repeater in accordance with various aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for connecting UEs with multiple base stations through a wireless repeater, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may identify a second base station that is connected to one or more UEs via a wireless repeater, receive, from the second base station, an indication of control information for the wireless repeater to communicate with the one or more UEs, and transmit, to the wireless repeater, the control information based on the received indication. The base station communications manager 815 may also identify a second base station that is connected to a first set of one or more UEs via a wireless repeater, determine a control signaling pattern based on identifying the second base station, and transmit, to the wireless repeater, control information for the wireless repeater to communicate with a second set of one or more UEs connected to the first base station via the wireless repeater, the control information transmitted in accordance with the control signaling pattern. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
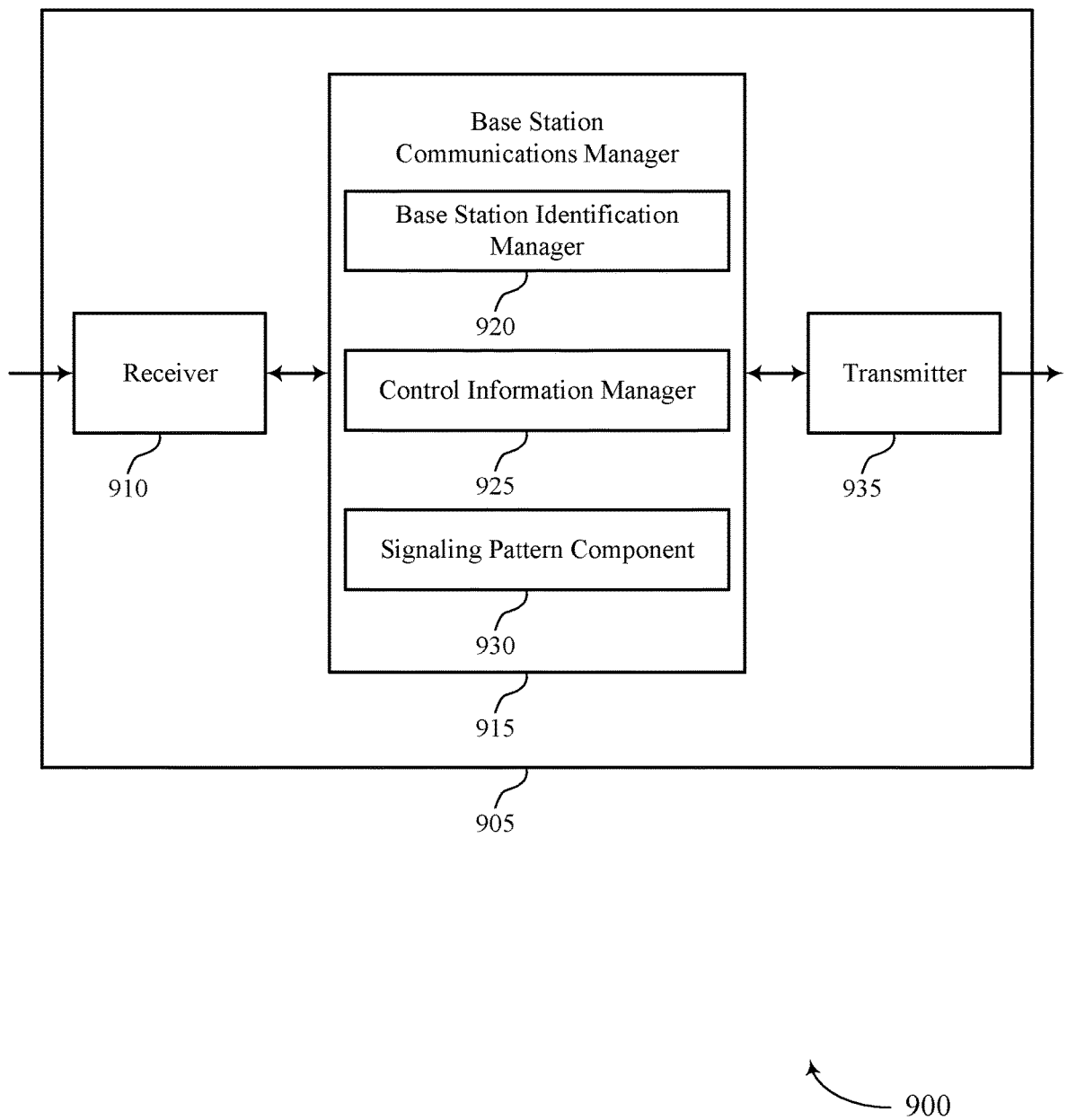

FIG. 9 shows a block diagram 900 of a device 905 that supports techniques for connecting UEs with multiple base stations through a wireless repeater in accordance with various aspects of the present disclosure. The device 905 may be an example of aspects of a device 805, or a base station 105 as described herein. The device 905 may include a receiver 910, a base station communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to techniques for connecting UEs with multiple base stations through a wireless repeater, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a base station identification manager 920, a control information manager 925, and a signaling pattern component 930. The base station communications manager 915 may be an example of aspects of the base station communications manager 1110 described herein.

The base station identification manager 920 may identify a second base station that is connected to one or more UEs via a wireless repeater. The control information manager 925 may receive, from the second base station, an indication of control information for the wireless repeater to communicate with the one or more UEs and transmit, to the wireless repeater, the control information based on the received indication.

The base station identification manager 920 may identify a second base station that is connected to a first set of one or more UEs via a wireless repeater. The signaling pattern component 930 may determine a control signaling pattern based on identifying the second base station. The control information manager 925 may transmit, to the wireless repeater, control information for the wireless repeater to communicate with a second set of one or more UEs connected to the first base station via the wireless repeater, the control information transmitted in accordance with the control signaling pattern.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
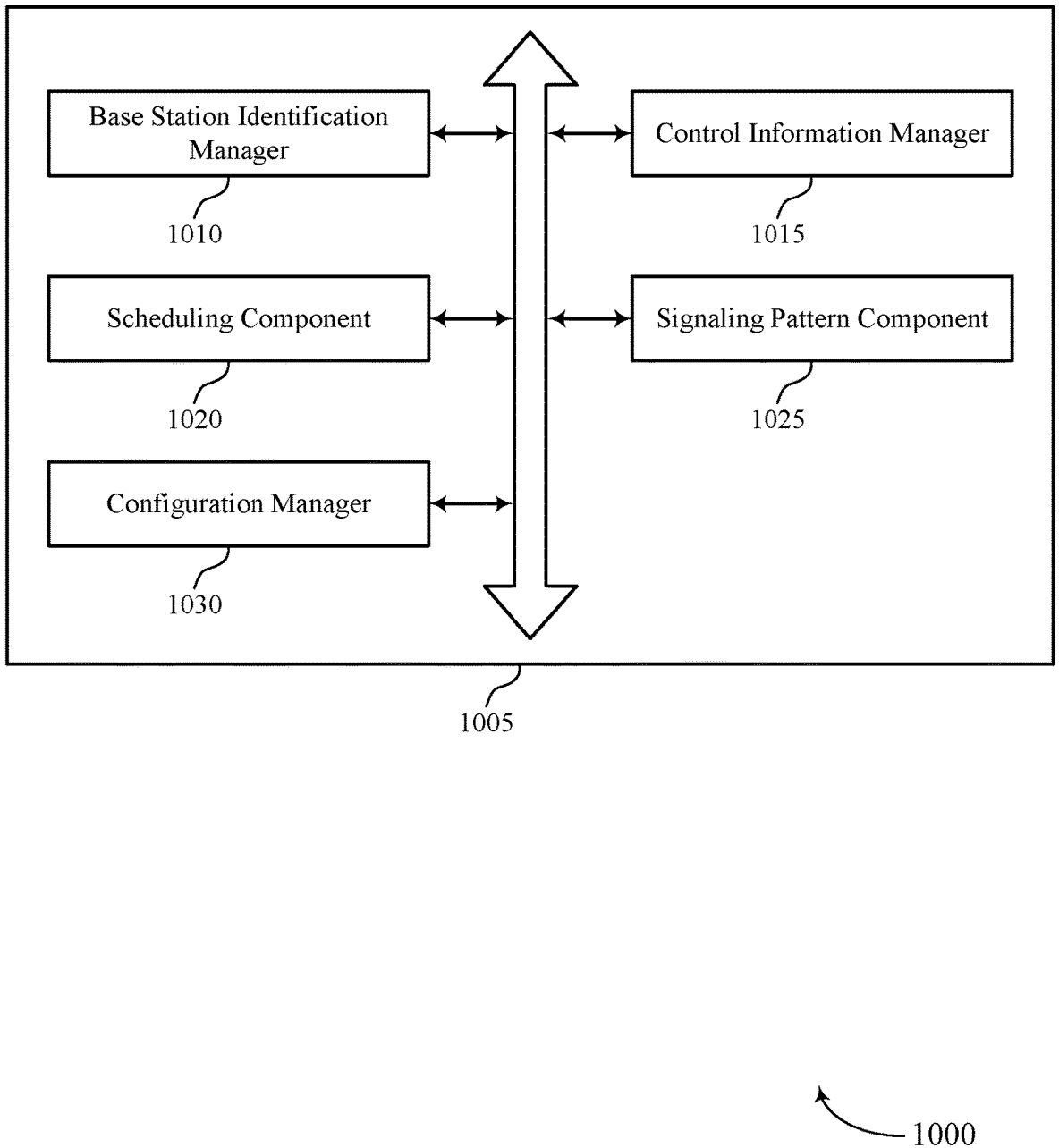
FIG. 10 shows a block diagram of a base station communications manager that supports techniques for connecting UEs with multiple base stations through a wireless repeater in accordance with various aspects of the present disclosure.

FIG. 10 shows a block diagram 1000 of a base station communications manager 1005 that supports techniques for connecting UEs with multiple base stations through a wireless repeater in accordance with various aspects of the present disclosure. The base station communications manager 1005 may be an example of aspects of a base station communications manager 815, a base station communications manager 915, or a base station communications manager 1110 described herein. The base station communications manager 1005 may include a base station identification manager 1010, a control information manager 1015, a scheduling component 1020, a signaling pattern component 1025, and a configuration manager 1030. Each of these components may communicate, directly or indirectly, with one another (e.g., via one or more buses).

The base station identification manager 1010 may identify a second base station that is connected to one or more UEs via a wireless repeater. In some examples, the base station identification manager 1010 may identify a second base station that is connected to a first set of one or more UEs via a wireless repeater. In some cases, the first base station is associated with a first identifier that is different from a second identifier associated with the second base station. In some cases, the first identifier includes a first radio network temporary identifier and the second identifier includes a second radio network temporary identifier.

The control information manager 1015 may receive, from the second base station, an indication of control information for the wireless repeater to communicate with the one or more UEs. In some examples, the control information manager 1015 may transmit, to the wireless repeater, the control information based on the received indication. In some examples, the control information manager 1015 may transmit, to the wireless repeater, control information for the wireless repeater to communicate with a second set of one or more UEs connected to the first base station via the wireless repeater, the control information transmitted in accordance with the control signaling pattern.

In some examples, the control information manager 1015 may receive the indication of the control information over a backhaul link between the first base station and the second base station. In some examples, the control information manager 1015 may determine second control information for the wireless repeater to communicate with one or more UEs connected to the first base station via the wireless repeater. In some examples, the control information manager 1015 may transmit, to the wireless repeater, the second control information based on the communications schedule.

In some examples, the control information manager 1015 may transmit the control information in a portion of a bandwidth used to transmit one or more synchronization signal blocks to the wireless repeater. In some examples, the control information manager 1015 may transmit the control information in a first bandwidth that is different from a second bandwidth used to transmit one or more synchronization signal blocks to the wireless repeater. In some examples, the control information manager 1015 may transmit the control information in a portion of a bandwidth used to transmit one or more synchronization signal blocks to the wireless repeater.

In some cases, the control information includes an indication of at least one directional beam for communicating with the one or more UEs, a transmission direction, or any combination thereof. In some cases, the control information is transmitted over a physical downlink control channel. In some cases, the portion of the bandwidth includes a first bandwidth part that is the same as a second bandwidth part used by the second base station for transmitting second control information.

The signaling pattern component 1025 may determine a control signaling pattern based on identifying the second base station. In some cases, the first time period and the second time period are non-overlapping. In some cases, the first time period and the second time period are based on communicating with the second base station.

The scheduling component 1020 may determine a communications schedule for the wireless repeater based on the control information and the second control information. The configuration manager 1030 may configure a first time period for transmitting the control information to the wireless repeater. In some examples, configuring a second time period for the second base station to transmit second control information to the wireless repeater, where the control signaling pattern includes the first time period and the second time period.

Figure 11:
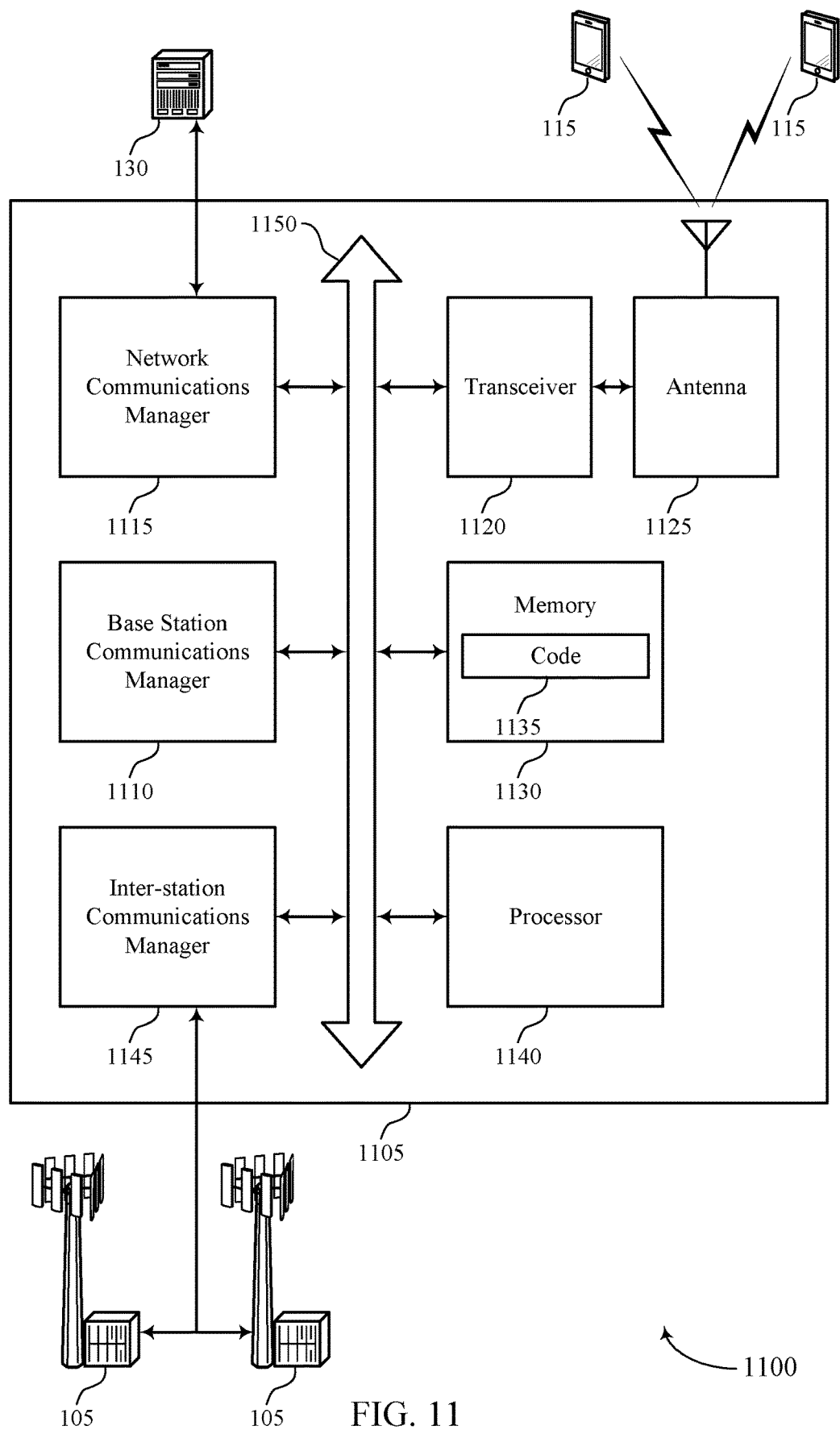
FIG. 11 shows a diagram of a system including a device that supports techniques for connecting UEs with multiple base stations through a wireless repeater in accordance with various aspects of the present disclosure.

FIG. 11 shows a diagram of a system 1100 including a device 1105 that supports techniques for connecting UEs with multiple base stations through a wireless repeater in accordance with various aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may identify a second base station that is connected to one or more UEs via a wireless repeater, receive, from the second base station, an indication of control information for the wireless repeater to communicate with the one or more UEs, and transmit, to the wireless repeater, the control information based on the received indication. The base station communications manager 1110 may also identify a second base station that is connected to a first set of one or more UEs via a wireless repeater, determine a control signaling pattern based on identifying the second base station, and transmit, to the wireless repeater, control information for the wireless repeater to communicate with a second set of one or more UEs connected to the first base station via the wireless repeater, the control information transmitted in accordance with the control signaling pattern.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques for connecting UEs with multiple base stations through a wireless repeater).

The inter-station communications manager 1145 may manage communications with another base station 105, and may include a controller or scheduler for controlling communications with UEs 115 in cooperation with the other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
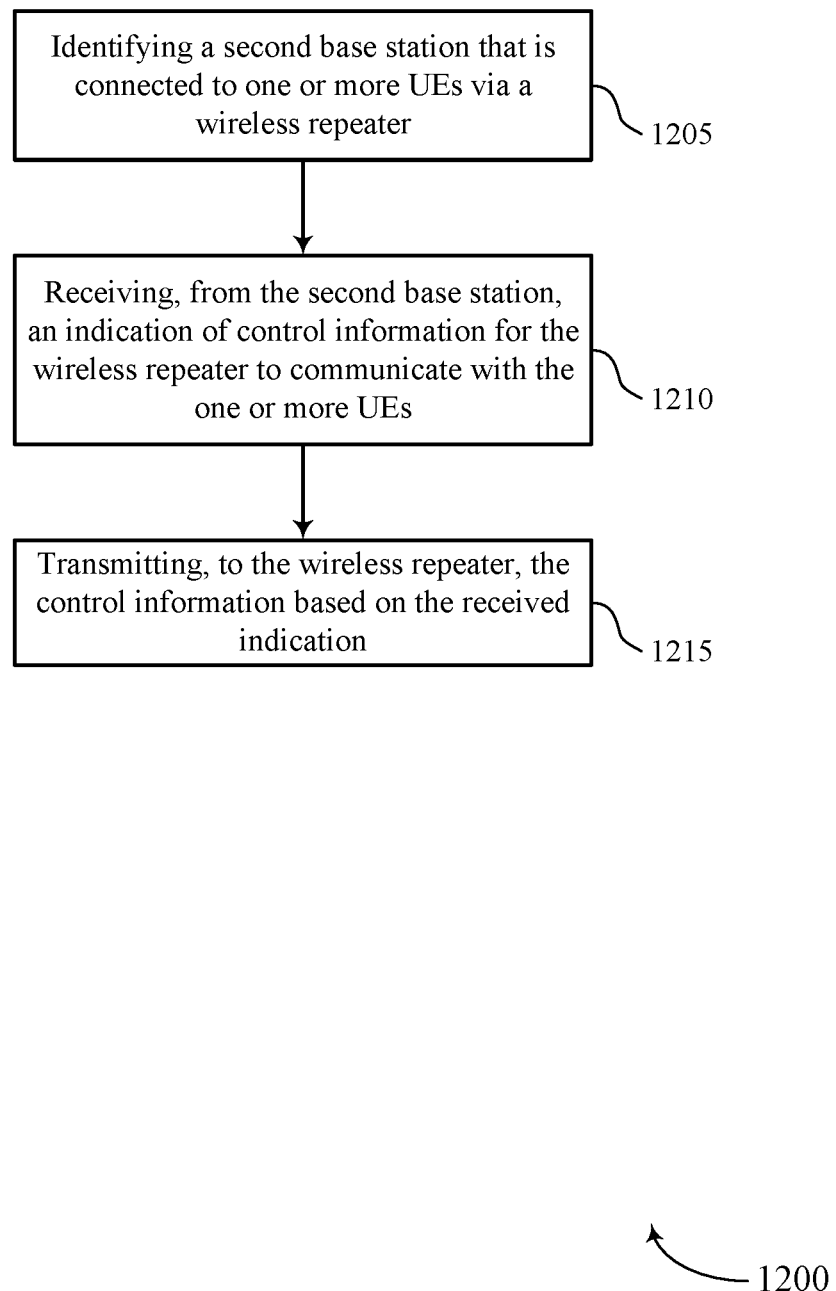
FIGS. 12 through 15 show flowcharts illustrating methods that support techniques for connecting UEs with multiple base stations through a wireless repeater in accordance with various aspects of the present disclosure.

FIG. 12 shows a flowchart illustrating a method 1200 that supports techniques for connecting UEs with multiple base stations through a wireless repeater in accordance with various aspects of the present disclosure. The operations of method 1200 may be implemented by a base station 105 or its components as described herein. For example, the operations of method 1200 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1205, the base station may identify a second base station that is connected to one or more UEs via a wireless repeater. The operations of 1205 may be performed according to the methods described herein. In some examples, aspects of the operations of 1205 may be performed by a base station identification manager as described with reference to FIGS. 8 through 11.

At 1210, the base station may receive, from the second base station, an indication of control information for the wireless repeater to communicate with the one or more UEs. The operations of 1210 may be performed according to the methods described herein. In some examples, aspects of the operations of 1210 may be performed by a control information manager as described with reference to FIGS. 8 through 11.

At 1215, the base station may transmit, to the wireless repeater, the control information based on the received indication. The operations of 1215 may be performed according to the methods described herein. In some examples, aspects of the operations of 1215 may be performed by a control information manager as described with reference to FIGS. 8 through 11.

Figure 13:
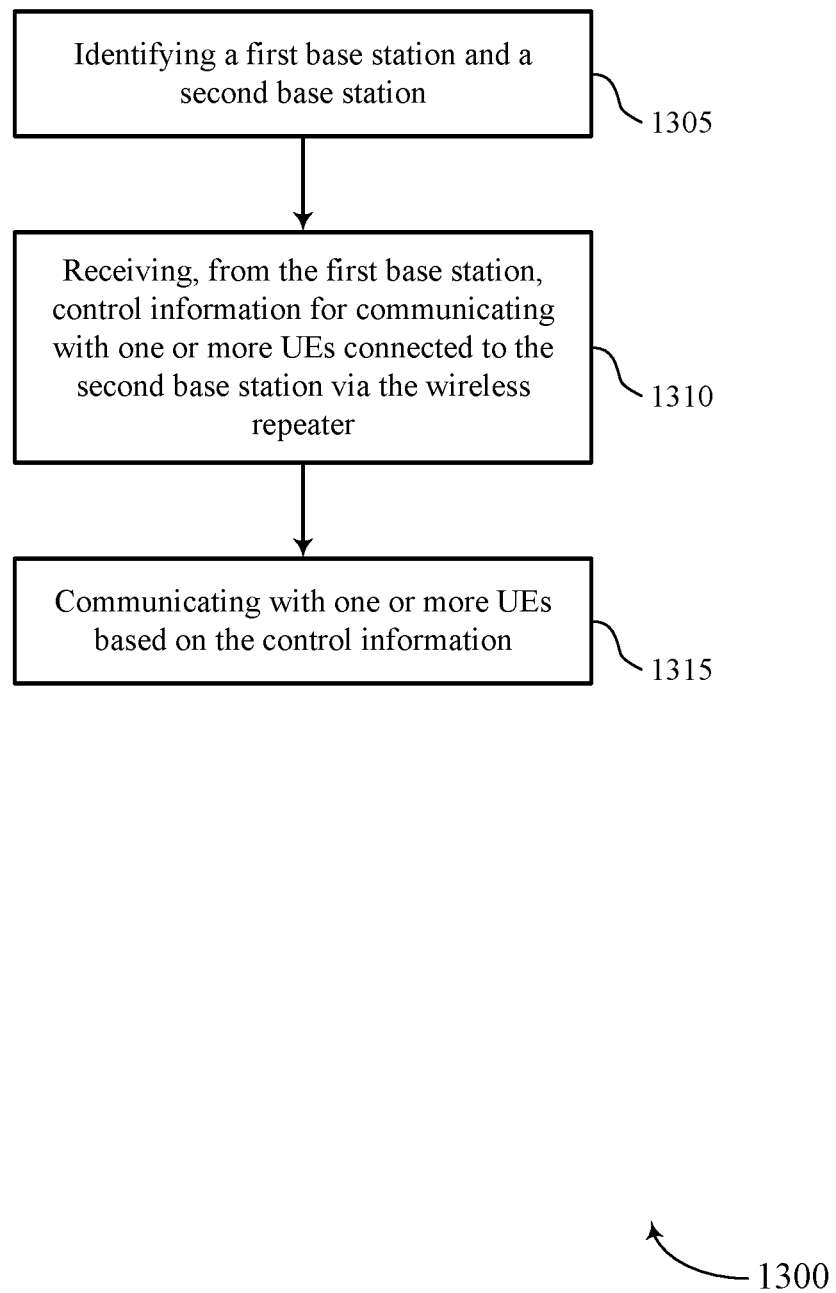

FIG. 13 shows a flowchart illustrating a method 1300 that supports techniques for connecting UEs with multiple base stations through a wireless repeater in accordance with various aspects of the present disclosure. The operations of method 1300 may be implemented by a wireless repeater (such as a wireless repeater 150 as shown in FIG. 1) or its components as described herein. For example, the operations of method 1300 may be performed by a wireless repeater communications manager as described with reference to FIGS. 4 through 7. In some examples, a wireless repeater may execute a set of instructions to control the functional elements of the wireless repeater to perform the functions described herein. Additionally or alternatively, a wireless repeater may perform aspects of the functions described herein using special-purpose hardware.

At 1305, the wireless repeater may identify a first base station and a second base station. The operations of 1305 may be performed according to the methods described herein. In some examples, aspects of the operations of 1305 may be performed by a link manager as described with reference to FIGS. 4 through 7.

At 1310, the wireless repeater may receive, from the first base station, control information for communicating with one or more UEs connected to the second base station via the wireless repeater. The operations of 1310 may be performed according to the methods described herein. In some examples, aspects of the operations of 1310 may be performed by a wireless repeater control manager as described with reference to FIGS. 4 through 7.

At 1315, the wireless repeater may communicate with one or more UEs based on the control information. The operations of 1315 may be performed according to the methods described herein. In some examples, aspects of the operations of 1315 may be performed by a link manager as described with reference to FIGS. 4 through 7.

Figure 14:
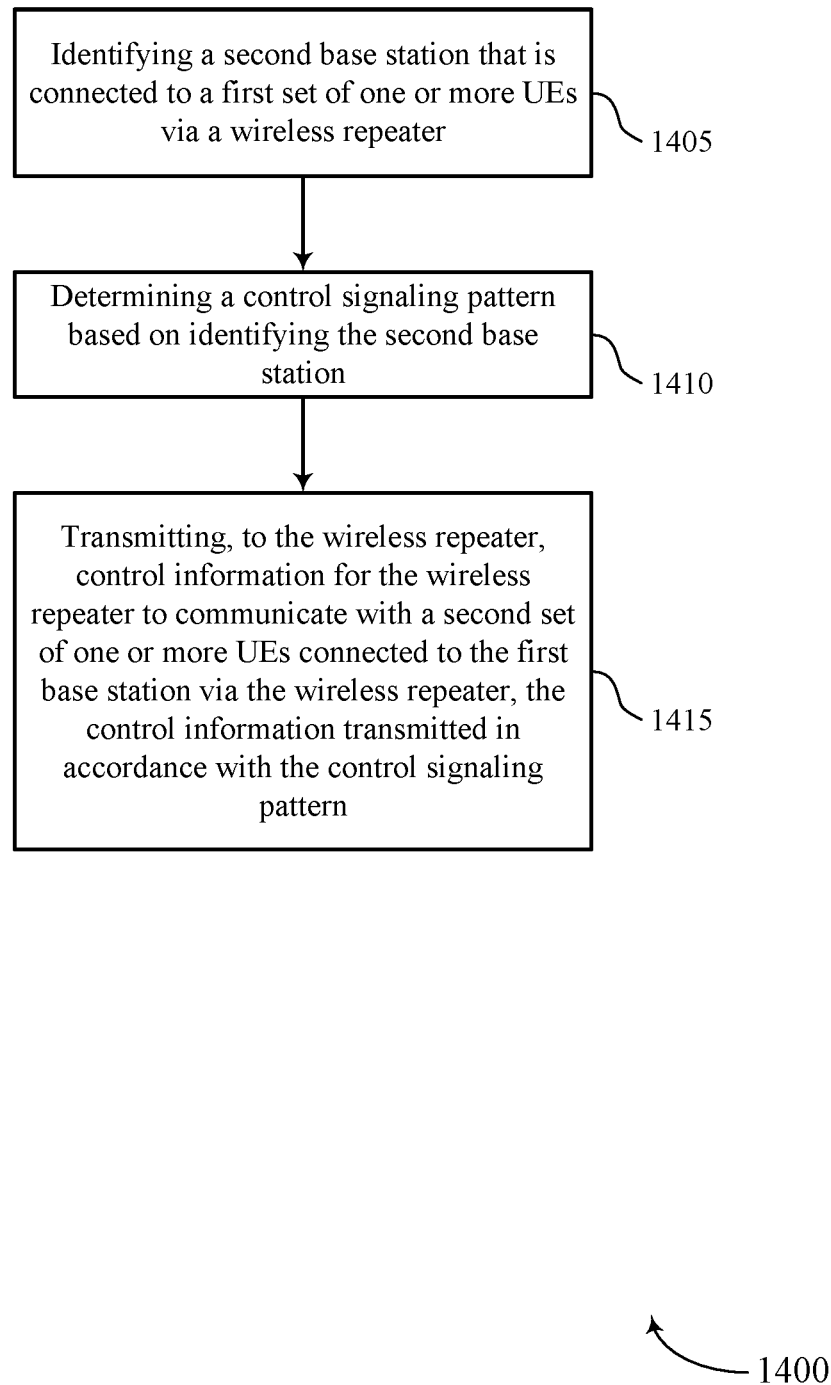

FIG. 14 shows a flowchart illustrating a method 1400 that supports techniques for connecting UEs with multiple base stations through a wireless repeater in accordance with various aspects of the present disclosure. The operations of method 1400 may be implemented by a base station 105 or its components as described herein. For example, the operations of method 1400 may be performed by a base station communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1405, the base station may identify a second base station that is connected to a first set of one or more UEs via a wireless repeater. The operations of 1405 may be performed according to the methods described herein. In some examples, aspects of the operations of 1405 may be performed by a base station identification manager as described with reference to FIGS. 8 through 11.

At 1410, the base station may determine a control signaling pattern based on identifying the second base station. The operations of 1410 may be performed according to the methods described herein. In some examples, aspects of the operations of 1410 may be performed by a signaling pattern component as described with reference to FIGS. 8 through 11.

At 1415, the base station may transmit, to the wireless repeater, control information for the wireless repeater to communicate with a second set of one or more UEs connected to the first base station via the wireless repeater, the control information transmitted in accordance with the control signaling pattern. The operations of 1415 may be performed according to the methods described herein. In some examples, aspects of the operations of 1415 may be performed by a control information manager as described with reference to FIGS. 8 through 11.

Figure 15:
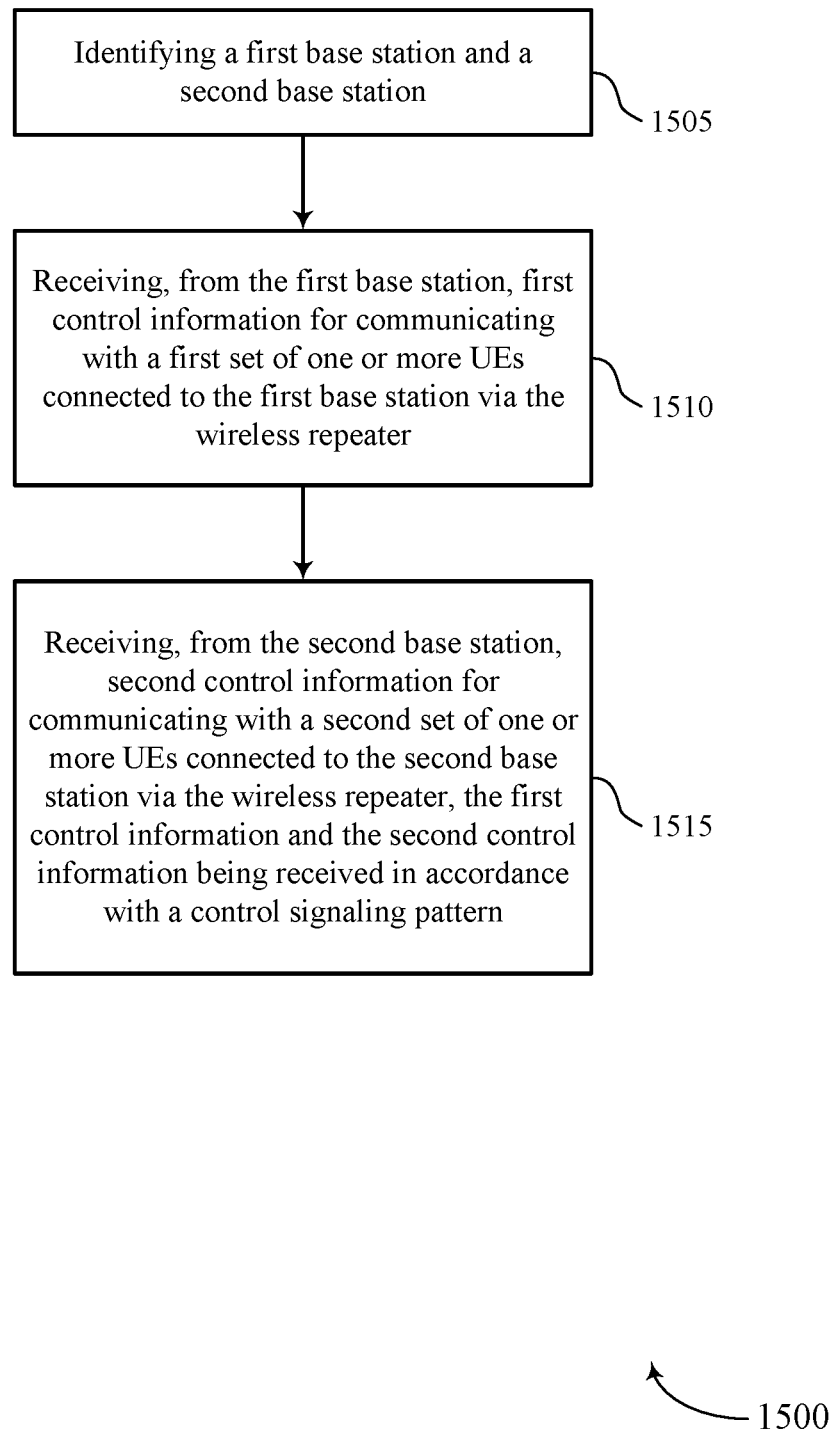

FIG. 15 shows a flowchart illustrating a method 1500 that supports techniques for connecting UEs with multiple base stations through a wireless repeater in accordance with various aspects of the present disclosure. The operations of method 1500 may be implemented by a wireless repeater or its components as described herein. For example, the operations of method 1500 may be performed by a wireless repeater communications manager as described with reference to FIGS. 4 through 7. In some examples, a wireless repeater may execute a set of instructions to control the functional elements of the wireless repeater to perform the functions described herein. Additionally or alternatively, a wireless repeater may perform aspects of the functions described herein using special-purpose hardware.

At 1505, the wireless repeater may identify a first base station and a second base station. The operations of 1505 may be performed according to the methods described herein. In some examples, aspects of the operations of 1505 may be performed by a link manager as described with reference to FIGS. 4 through 7.

At 1510, the wireless repeater may receive, from the first base station, first control information for communicating with a first set of one or more UEs connected to the first base station via the wireless repeater. The operations of 1510 may be performed according to the methods described herein. In some examples, aspects of the operations of 1510 may be performed by a wireless repeater control manager as described with reference to FIGS. 4 through 7.

At 1515, the wireless repeater may receive, from the second base station, second control information for communicating with a second set of one or more UEs connected to the second base station via the wireless repeater, the first control information and the second control information being received in accordance with a control signaling pattern. The operations of 1515 may be performed according to the methods described herein. In some examples, aspects of the operations of 1515 may be performed by a wireless repeater control manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes examples and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first network entity, comprising:

identifying a second network entity that is connected to one or more user equipment (UEs) via a first direct wireless communication link between the second network entity and a wireless repeater;

receiving, from the second network entity, an indication of control information for controlling the wireless repeater based at least in part on the wireless repeater being restricted to monitor for control information from the first network entity, wherein the control information indicates whether the wireless repeater is to transmit uplink communications to the first network entity, or uplink communications to the second network entity, or downlink communications to the one or more UEs, or any combination thereof;

transmitting, to the wireless repeater, via a second direct wireless communication link between the first network entity and the wireless repeater, the control information based at least in part on the received indication and based at least in part on a control signaling pattern; and transmitting, to the wireless repeater, second control information based at least in part on the control signaling pattern, wherein the control signaling pattern is based at least in part on the control information and the second control information, the control information associated with the second network entity and the second control information associated with the first network entity, wherein the control signaling pattern comprises respective time intervals configured for transmissions of control signaling from respective network entities to the wireless repeater, the respective network entities comprising at least the first network entity and the second network entity.

2. The method of claim 1, wherein receiving the indication of the control information comprises:

receiving the indication of the control information over a backhaul link between the first network entity and the second network entity.

3. The method of claim 1, further comprising:
determining the second control information for the wireless repeater to communicate with one or more UEs connected to the first network entity via the wireless repeater; and
determining the control signaling pattern for the wireless repeater based at least in part on the control information and the second control information.

4. The method of claim 1, wherein the control information further comprises an indication of at least one directional beam for communicating with the one or more UEs, the first network entity, the second network entity, or any combination thereof.

5. The method of claim 1, wherein transmitting the control information comprises:
transmitting the control information in a portion of a bandwidth used to transmit one or more synchronization signal blocks to the wireless repeater.

6. The method of claim 1, wherein transmitting the control information comprises:
transmitting the control information in a first bandwidth that is different from a second bandwidth used to transmit one or more synchronization signal blocks to the wireless repeater.

7. The method of claim 1, wherein the control information is transmitted over a physical downlink control channel.

8. An apparatus for wireless communication at a first network entity, comprising:
a processor; and
a memory coupled with the processor, wherein and the memory comprises instructions executable by the processor to cause the apparatus to:
identify a second network entity that is connected to one or more user equipment (UEs) via a first direct wireless communication link between the second network entity and a wireless repeater;
receive, from the second network entity, an indication of control information for the wireless repeater based at least in part on the wireless repeater being restricted to monitor for control information from the first network entity, wherein the control information indicates whether the wireless repeater is to transmit uplink communications to the first network entity, or uplink communications to the second network entity, or downlink communications to the one or more UEs, or any combination thereof;
transmit, to the wireless repeater, via a second direct wireless communication link between the first network entity and the wireless repeater, the control information based at least in part on the received indication and based at least in part on a control signaling pattern; and
transmit, to the wireless repeater, second control information based at least in part on the control signaling pattern, wherein the control signaling pattern is based at least in part on the control information and the second control information, the control information associated with the second network entity and the second control information associated with the first network entity, wherein the control signaling comprises respective time intervals configured for transmissions of control signaling from respective network entities to the wireless repeater, the respective network entities comprising at least the first network entity and the second network entity.

9. The apparatus of claim 8, wherein the instructions to receive the indication of the control information are executable by the processor to cause the apparatus to:
receive the indication of the control information over a backhaul link between the first network entity and the second network entity.

10. The apparatus of claim 8, wherein the instructions are further executable by the processor to cause the apparatus to:
determine the second control information for the wireless repeater to communicate with one or more UEs connected to the first network entity via the wireless repeater; and
determine the control signaling pattern for the wireless repeater based at least in part on the control information and the second control information.

11. The apparatus of claim 8, wherein the control information further comprises an indication of at least one directional beam for communicating with the one or more UEs, the first network entity, the second network entity, or any combination thereof.

12. The apparatus of claim 8, wherein the instructions to transmit the control information are executable by the processor to cause the apparatus to:
transmit the control information in a portion of a bandwidth used to transmit one or more synchronization signal blocks to the wireless repeater.

13. The apparatus of claim 8, wherein the instructions to transmit the control information are executable by the processor to cause the apparatus to:
transmit the control information in a first bandwidth that is different from a second bandwidth used to transmit one or more synchronization signal blocks to the wireless repeater.

14. The apparatus of claim 8, wherein the control information is transmitted over a physical downlink control channel.

15. An apparatus for wireless communication at a first network entity, comprising:
means for identifying a second network entity that is connected to one or more user equipment (UEs) via a first direct wireless communication link between the second network entity and a wireless repeater;
means for receiving, from the second network entity, an indication of control information for the wireless repeater based at least in part on the wireless repeater being restricted to monitor for control information from the first network entity, wherein the control information indicates whether the wireless repeater is to transmit uplink communications to the first network entity, or uplink communications to the second network entity, or downlink communications to the one or more UEs, or any combination thereof;
means for transmitting, to the wireless repeater, via a second direct wireless communications link between the first network entity and the wireless repeater, the control information based at least in part on the received indication and based at least in part on a control signaling pattern; and
means for transmitting, to the wireless repeater, second control information based at least in part on a control signaling pattern, wherein the control signaling pattern is based at least in part on the control information and the second control information, the control information associated with the second network entity and the second control information associated with the first network entity, wherein the control signaling comprises respective time intervals configured for transmissions of control signaling from respective network entities to the wireless repeater, the respective network entities comprising at least the first network entity and the second network entity.

16. The apparatus of claim 15, wherein the means for receiving the indication of the control information comprise:
means for receiving the indication of the control information over a backhaul link between the first network entity and the second network entity.

17. The apparatus of claim 15, further comprising:
means for determining the second control information for the wireless repeater to communicate with one or more UEs connected to the first network entity via the wireless repeater; and
means for determining the control signaling pattern for the wireless repeater based at least in part on the control information and the second control information.

18. The apparatus of claim 15, wherein the control information further comprises an indication of at least one directional beam for communicating with the one or more UEs, the first network entity, the second network entity, or any combination thereof.

19. The apparatus of claim 15, wherein the means for transmitting the control information comprise:
means for transmitting the control information in a portion of a bandwidth used to transmit one or more synchronization signal blocks to the wireless repeater.

20. The apparatus of claim 15, wherein the means for transmitting the control information comprise:
means for transmitting the control information in a first bandwidth that is different from a second bandwidth used to transmit one or more synchronization signal blocks to the wireless repeater.

21. The apparatus of claim 15, wherein the control information is transmitted over a physical downlink control channel.

22. A non-transitory computer-readable medium storing code for wireless communication at a first network entity, the code comprising instructions executable by a processor to:
identify a second network entity that is connected to one or more user equipment (UEs) via a first direct wireless communication link between the second network entity and a wireless repeater;
receive, from the second network entity, an indication of control information for the wireless repeater based at least in part on the wireless repeater being restricted to monitor for control information from the first network entity, wherein the control information indicates whether the wireless repeater is to transmit uplink communications to the first network entity, or uplink communications to the second network entity, or downlink communications to the one or more UEs, or any combination thereof;
transmit, to the wireless repeater, via a second direct wireless communication link between the first network entity and the wireless repeater, the control information based at least in part on the received indication and based at least in part on a control signaling pattern; and
transmit, to the wireless repeater, second control information based at least in part on a control signaling pattern, wherein the control signaling pattern is based at least in part on the control information and the second control information, the control information associated with the second network entity and the second control information associated with the first network entity, wherein the control signaling comprises respective time intervals configured for transmissions of control signaling from respective network entities to the wireless repeater, the respective network entities comprising at least the first network entity and the second network entity.

23. The non-transitory computer-readable medium of claim 22, wherein the instructions to receive the indication of the control information are executable by the processor to:
receive the indication of the control information over a backhaul link between the first network entity and the second network entity.

24. The non-transitory computer-readable medium of claim 22, wherein the instructions are further executable by the processor to:
determine the second control information for the wireless repeater to communicate with one or more UEs connected to the first network entity via the wireless repeater; and
determine the control signaling pattern for the wireless repeater based at least in part on the control information and the second control information.

25. The non-transitory computer-readable medium of claim 22, wherein the control information further comprises an indication of at least one directional beam for communicating with the one or more UEs, the first network entity, the second network entity, or any combination thereof.

26. The non-transitory computer-readable medium of claim 22, wherein the instructions to transmit the control information are executable by the processor to:
transmit the control information in a portion of a bandwidth used to transmit one or more synchronization signal blocks to the wireless repeater.

27. The non-transitory computer-readable medium of claim 22, wherein the instructions to transmit the control information are executable by the processor to:
transmit the control information in a first bandwidth that is different from a second bandwidth used to transmit one or more synchronization signal blocks to the wireless repeater.

28. The non-transitory computer-readable medium of claim 22, wherein the control information is transmitted over a physical downlink control channel.

* * * * *